United States Patent [19]
La Mar et al.

[11] Patent Number: 6,144,741
[45] Date of Patent: Nov. 7, 2000

[54] SYSTEM FOR DISPENSING GIFT CERTIFICATES

[75] Inventors: Donald R. La Mar, Buckner; David S. Owens; Michael L. Nelligan, both of Louisville, all of Ky.; Mark A. Kleier, New Albany, Ind.

[73] Assignee: Mid America Gift Certificate Company, Louisville, Ky.

[21] Appl. No.: 09/272,198

[22] Filed: Mar. 18, 1999

Related U.S. Application Data

[60] Provisional application No. 60/078,530, Mar. 19, 1998.

[51] Int. Cl.[7] ........................................................ H04L 9/00
[52] U.S. Cl. .................................. 380/4; 705/16; 235/381
[58] Field of Search .................................... 380/4; 705/16; 235/381

[56] References Cited

U.S. PATENT DOCUMENTS 5,982,891  11/1999  Gintar ........................................... 380/4

*Primary Examiner*—Harold I. Pitts
*Attorney, Agent, or Firm*—Vance A. Smith; Stites & Harbison

[57] ABSTRACT

A system for customizing documents. Security is maintained by storing the names of system operators with each operator being associated with one or a plurality of passwords. Pull down menus and printing are provided.

6 Claims, 33 Drawing Sheets

Gift Certificate Detail

Amount: $10.00

Item Number:

Payee:

Occasion: ▶

Purchaser:

Quantity: 1

☐ Use Same Payee For Remaining Transactions

[Ok]  [Next]  [Preview]

FIG.2J

Purchaser Information

- Name
- Address
- City
- State
- Zip Code
- Phone
- Optional

Ok
Cancel 800
802

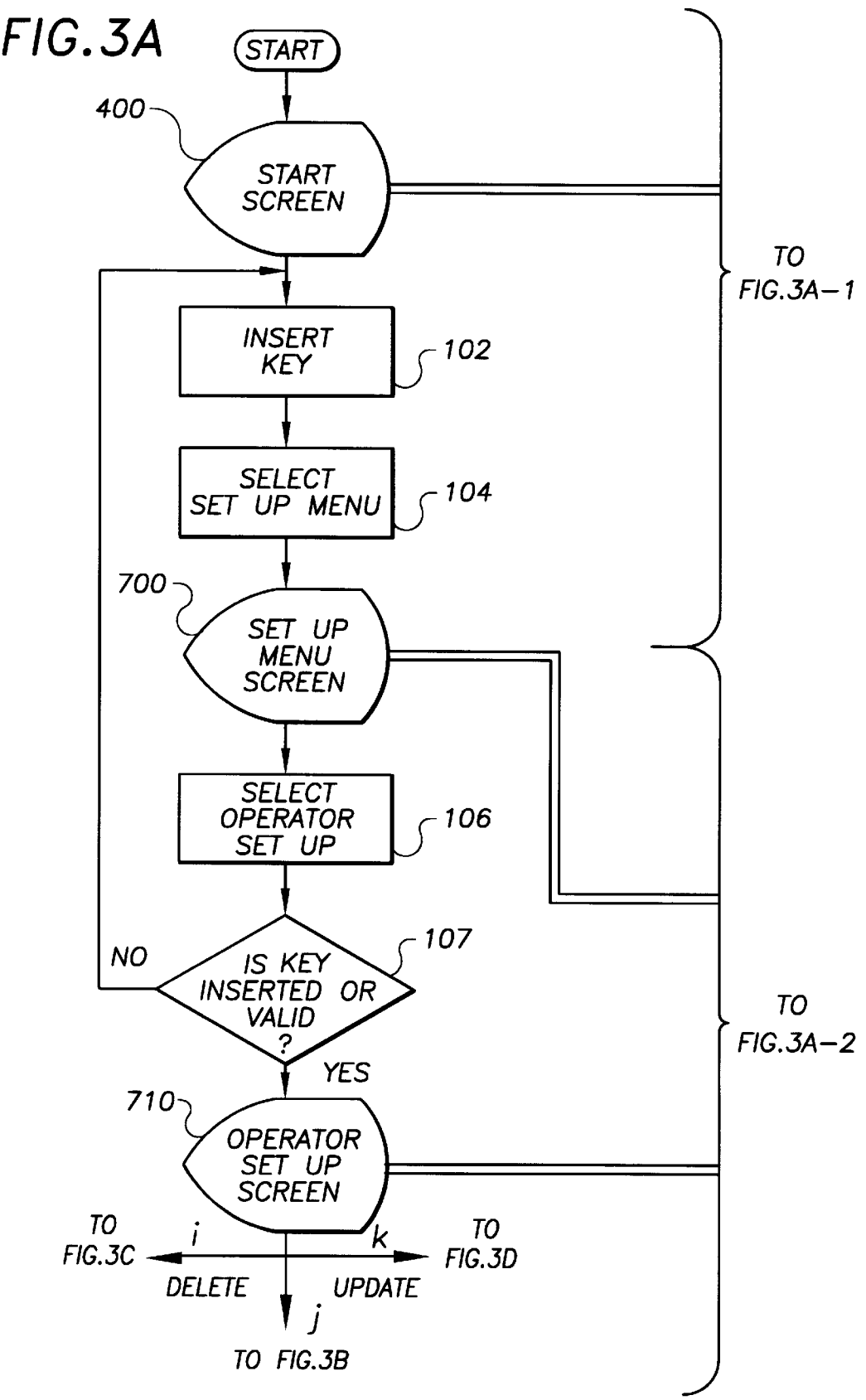

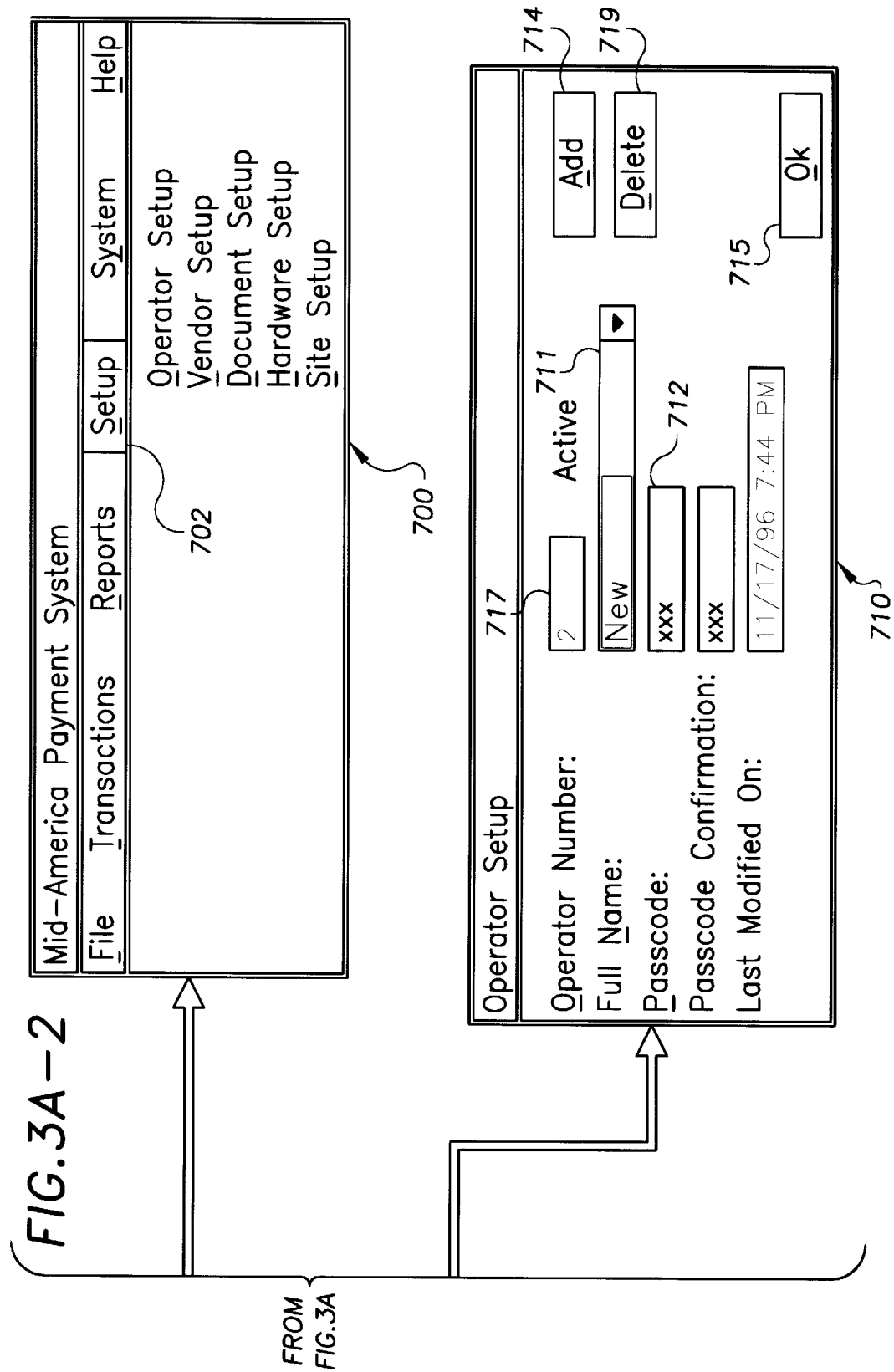

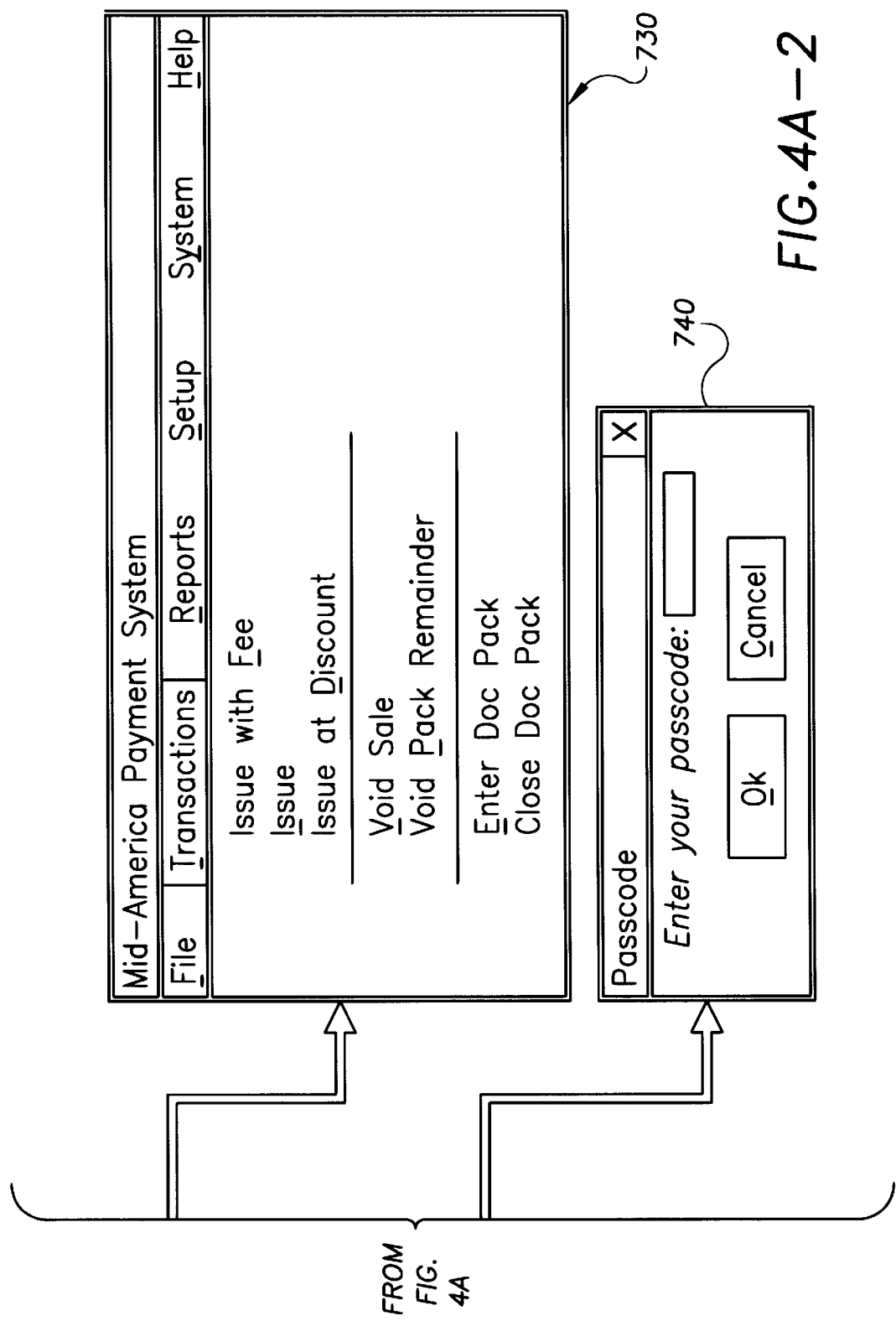

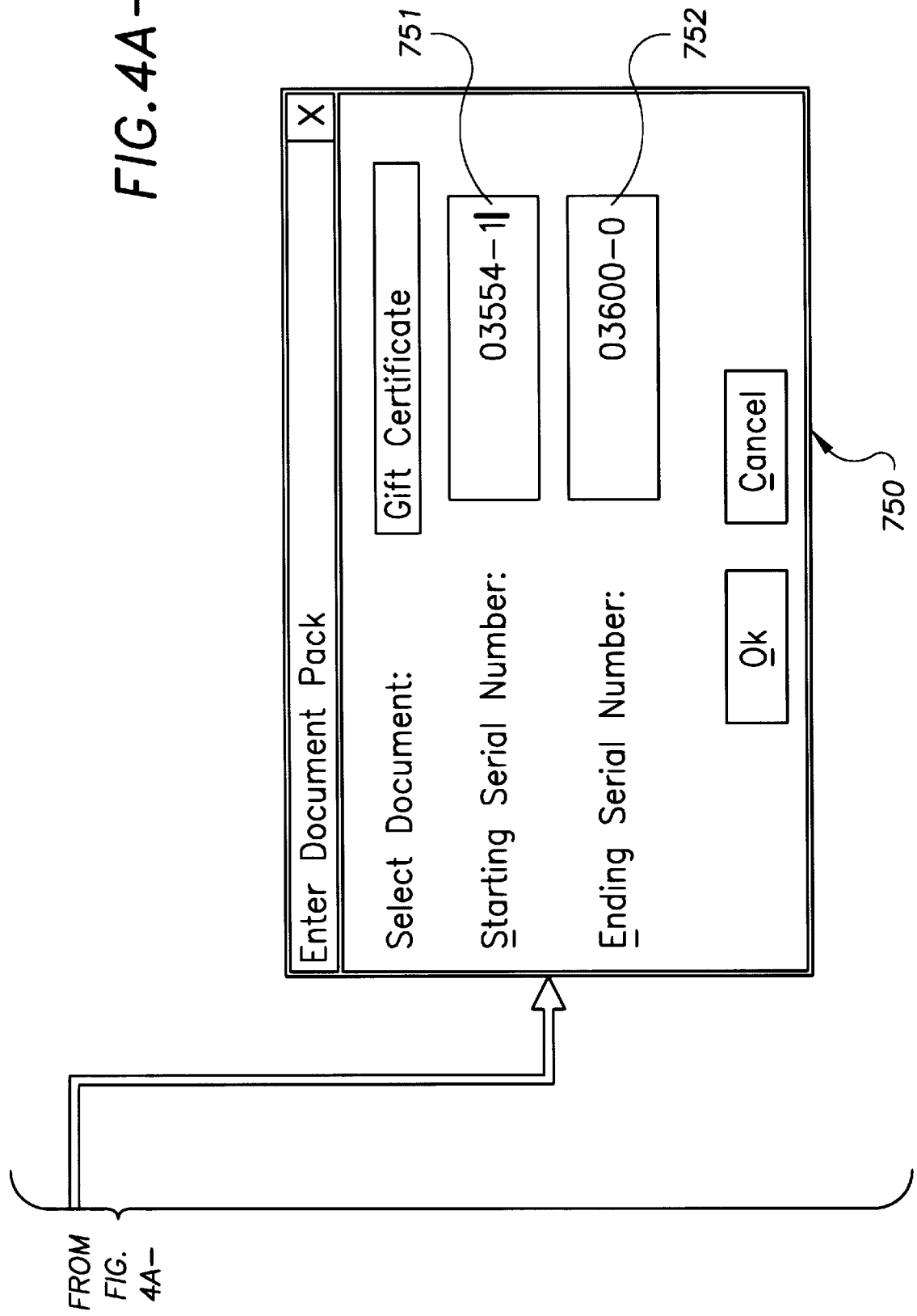

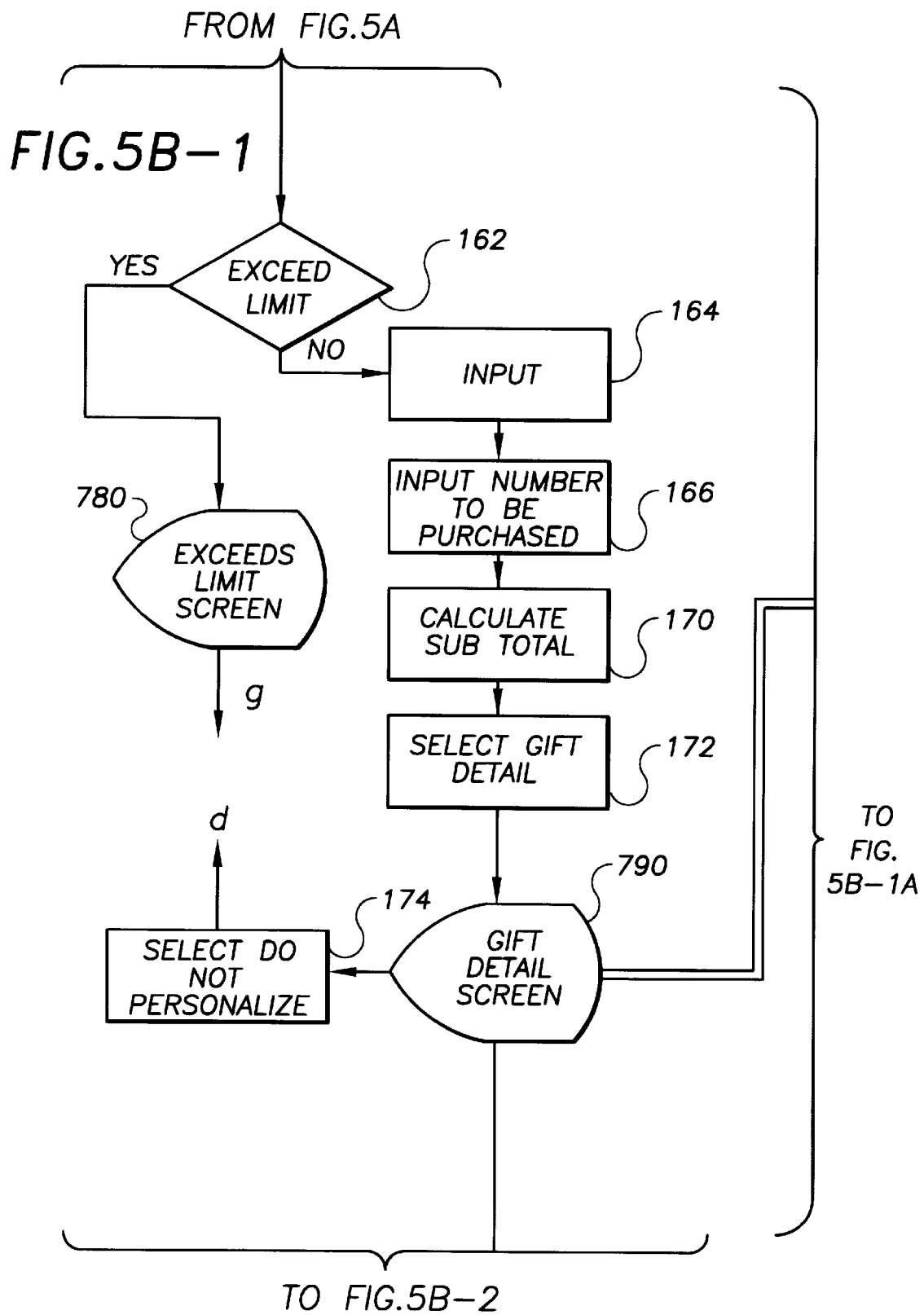

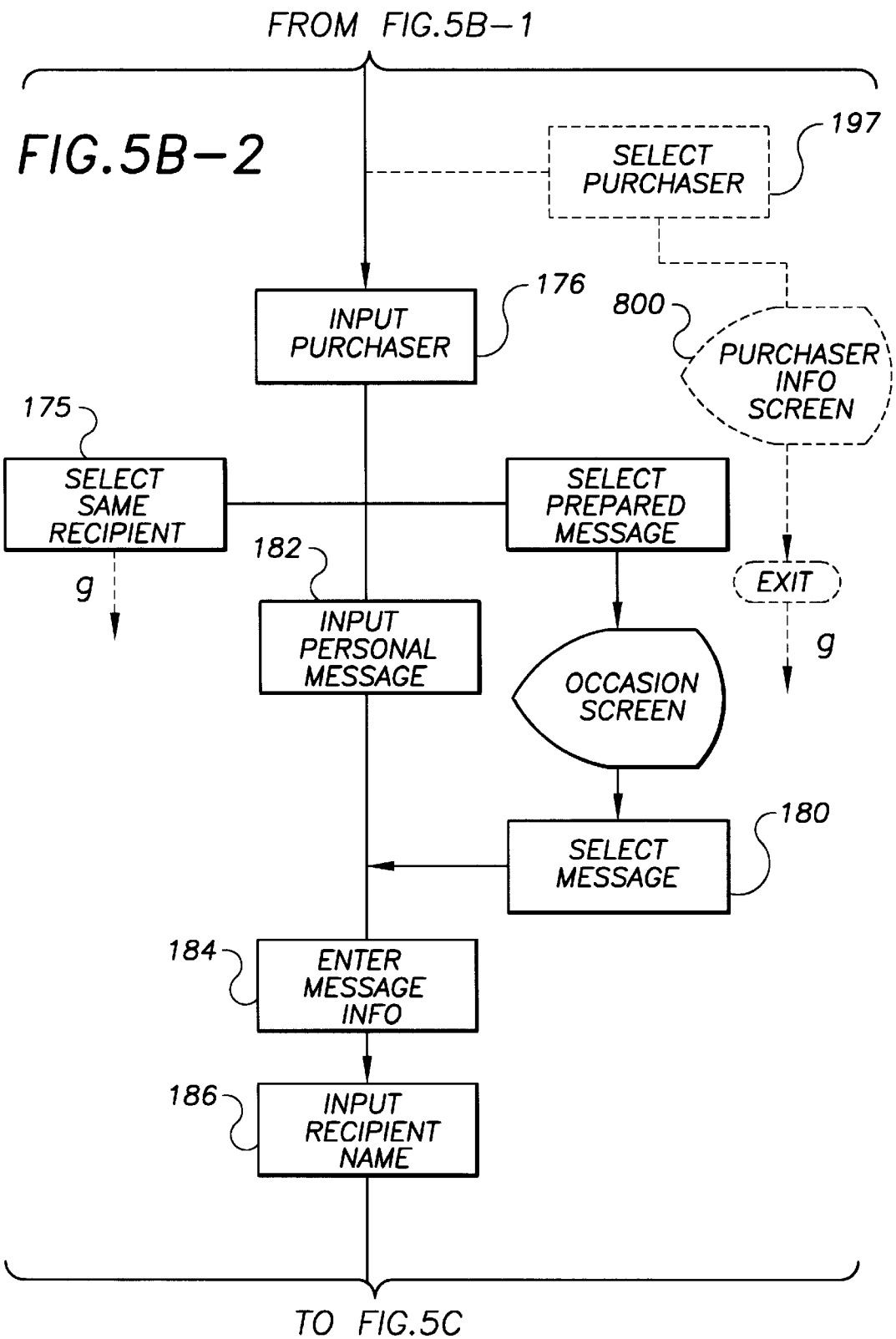

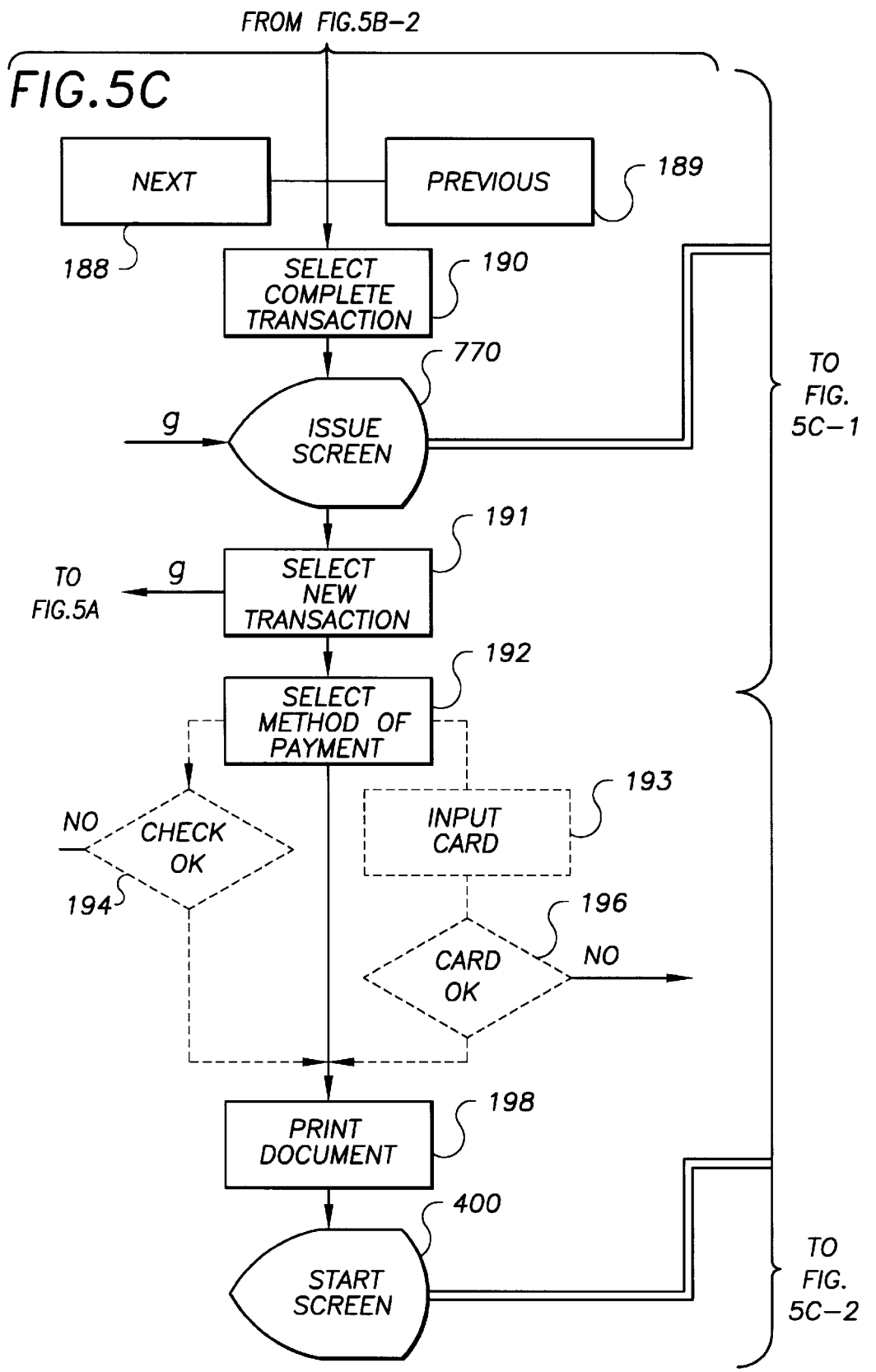

FIG.5C-1

- Issue
- Amount
- Quantity  Sub Total  $0.00
- Add
- Total  0  $0.00
- Documents Remaining in Pack: 47
- Purchaser Info... — 770a
- Ok
- Cancel
- Method of Payment — 772
  - ● Cash
  - ○ Checks
  - ○ Credit Card

770

FROM FIG. 5C

FROM FIG. 5C

SYSTEM FOR DISPENSING GIFT CERTIFICATES

This application claims priority from Provisional Application 60/078,530 filed Mar. 19, 1998.

BACKGROUND OF THE INVENTION

The present invention pertains to a system for issuing transferable or negotiable documents, such as gift certificates, at a central station, typically located in a shopping center or the like, where the various merchants of the center are participants.

A gift certificate system is disclosed and described in U.S. Pat. Nos. 5,243,174 and 5,500,514, issued, respectively, Sep. 7, 1993 and Mar. 19, 1996, and both assigned to the Gift Certificate Center, Inc. In this system, a customer interacts with the system through a touch-type of monitor and a computer-generated menu of choices and selects one or more gift certificates of various amounts and a selected commercial retailer from a menu of participating retailers. This information is communicated back to a central processing station. Upon payment through a credit card or a like card, properly identified and accepted, the gift certificate or certificates are printed by a printer and issued to the customer. Each certificate is unique for the selected merchant and may be used only t the selected retailer, and the information concerning the credit card is processed by the central processing unit and billed to the credit card account. Information concerning the transaction may be communicated periodically back to the participating retailer from the central processing unit.

Still another system of issuing money orders is described in U.S. Pat. No. 4,870,596 issued Sep. 26, 1989 and assigned to Republic Money Orders, Inc. In this system, a money order dispenser is located in a retail establishment and comprises a monitor, a local data processor and memory device, an input device, and a printer. A system controller is located at a remote location and controls the overall operation of the system. It is contemplated that each operator employed at the retail establishment would have a code unique to that operator for preparing and issuing money orders. Changing of the operator codes and parameters of the money order values and limits would require the use of a separate code unique to the person at the establishment imbued with the responsibility and authority to make such changes. Additionally, safety features are installed to disable the system should tampering of the printer be detected. Periodically, the local memory device is polled by the remote controller for information concerning the money order transactions, and such information is transmitted to the remote controller.

The systems described in the patent literature have a variety of shortcomings including the inability to customize some or all of the documents that may be issued in a single transaction. Additionally, the trend today is for the management of the shopping centers and malls to develop services for the various merchants in that mall. Thus, it is becoming increasingly important that the issued documents be usable for each mall merchant that agrees to participate in a document programs such as a gift certificate program. However, it is important that such documents like gift certificates, even where large multiple document transactions are conducted, have a personalized appearance.

Thus, it is a paramount object of the present invention to devise an operator-friendly system in which each document can be specifically personalized, if desired, without requiring a great deal of operator time.

It is still another object of the present invention to provide for a system that has wide flexibility, allowing for the preparation of multiple documents, each personalized with a message appropriate for the occasion.

It is yet an additional object of the present invention to provide for system having the aforementioned flexibility that is accepted by all participating merchants of the system when installed in a mall or shopping center.

It is yet another object of the present invention to provide for a system that is secure and reacts to unusual circumstances by requiring input of necessary information before continuing the preparation and dispensing of documents.

It is still a further object of the present invention to provide for a secure system having a first level of security that requires the use of an external key before certain important system parameters can be changed or altered by supervisory personnel.

It is still yet another important object of the present invention to provide for a system that has a second level of security compatible with the first level of security ensuring that only selected operators can customize and dispense documents to customers.

These and other objects will become apparent upon reading of the foregoing description and appended drawings.

DESCRIPTION OF THE DRAWING

FIGS. 2A–2J are representations of the various major screens that are viewed and used by an operator operating the system of the present invention wherein FIG. 2A is the Start Up Screen, FIG. 2B is the pass code screen, FIG. 2C is the Issue Document Screen, FIG. 2D is the Document Detail Screen, FIG. 2E is the Enter New Document Package Screen, FIG. 2F is the Void Document Screen, FIG. 2G is the Set Up Screen, FIG. 2H is the Operator Set Up Screen, FIG. 2I is the Transaction menu Screen, and FIG. 2J is the Purchaser Information Screen;

DETAILED DESCRIPTION OF THE PREFERRED EMBODIMENT

As will be apparent from a reading of the description with the appended figures, the menu screens described and illustrated are in a graphic user interface common to compatible with the Windows 95® operating system, a system marketed under the trademark of the Microsoft Corporation. For clarity, the following description parallels the sequence that will be experienced by the commercial establishment in establishing and using the system of the present invention. The description uses figures depicting appropriate menu screens in tandem with respective flow chart figures to describe the operative sequence of applicants' system. Thus, the description below first sets forth the hardware that it used in the present system followed by the operative sequence for establishing appropriate operator pass codes, entry into the system of the document pack of certificates be entered, the issuance of customized documents, discounting of documents, and voiding of transactions. To render the description as clear as possible, the flow charts utilize associated screens enlarged to illustrate the various virtual buttons to be clicked by a mouse or the like and the various fields of the displayed screens to be used by the operator.

Figure 1:
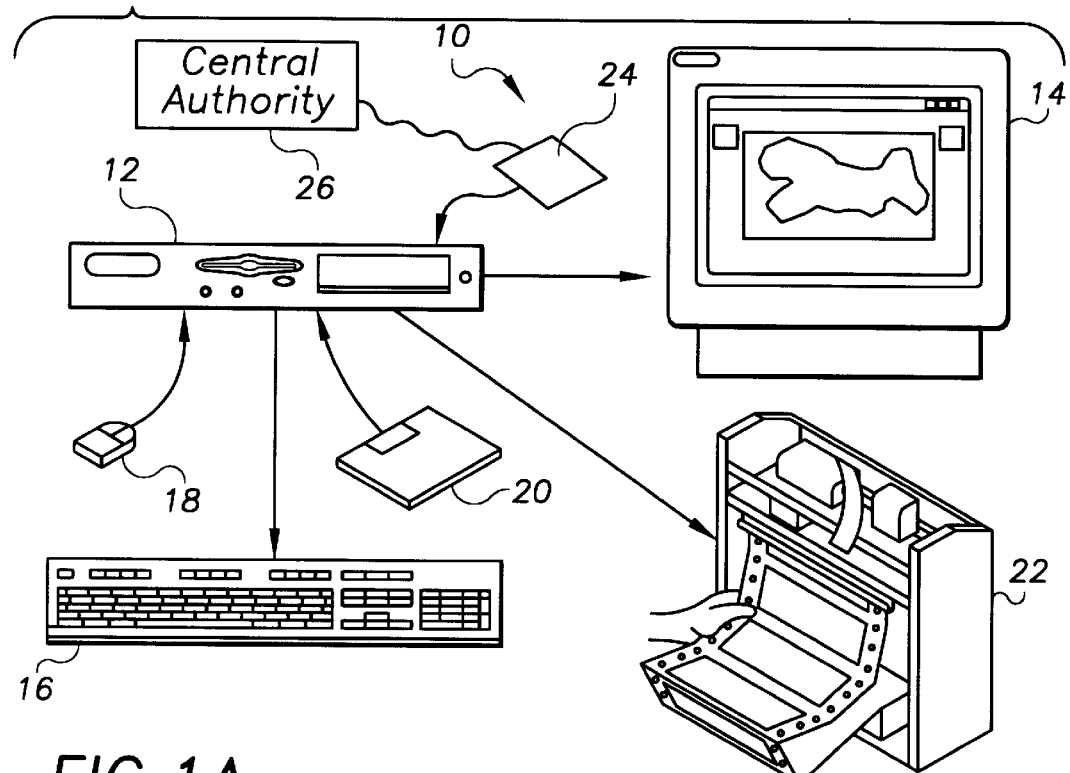
FIG. 1 is schematic of the hardware used in conjunction with the system of the present invention.

The hardware used in the operation of the system is largely available as off-of-the-shelf components. As illustrated in FIG. 1, the hardware part of the system, shown generally as character numeral 10, is comprised of a number of individual major units. A PC 12 is tied to a typical monitor 14, such a 15" color monitor, available from the Compaq Corporation, a key board 16, and a mouse 18. The diskette 20 is a control diskette or key and plays a large security role as is further described below. The printer 22 is a secured dot matrix printer such as Model PI 21 available from the Standard Register Company. The PC 12 has a modem 24 that communicates with an off-site central receiving and storage device 26. As discussed below, the system is configured so as to regularly communicate with the device 26 and provide information pertaining to transactions completed during a predetermined time period. Receiving device 26 is capable of receiving such information for later review and analyzation from a plurality of hardware-software systems.

Figure 1A:
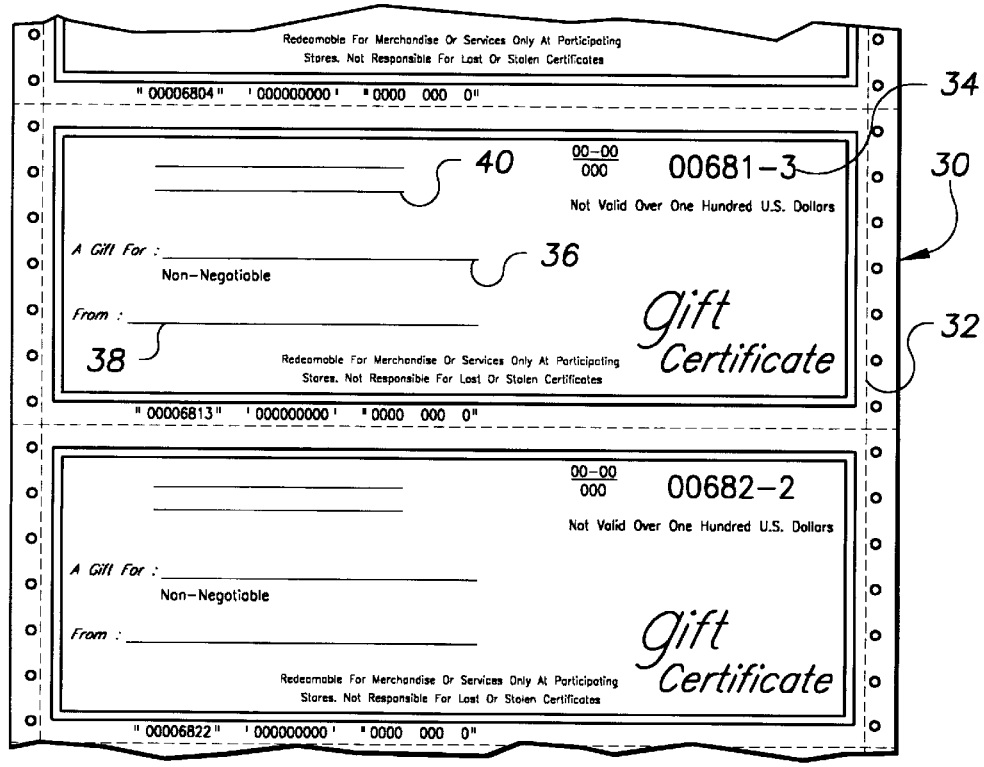
FIG. 1A is a schematic of a sheet of documents, positioned in a printer, that may be utilized with the system in accordance with the present invention.

An example of the document forms used in the present invention is depicted in FIG. 1A. The sheet 30 is a typical pin-fed sheet having perforated and separable sections that form the individual documents 32. Each document 32 is identified by a unique number 34 preferably in ascending numerical order, has spaces for the name of the recipient 36, purchaser 38, and an area shown generally as character numeral 40 reserved for the printing of a message.

Operator Setup Routine

Figure 2A:
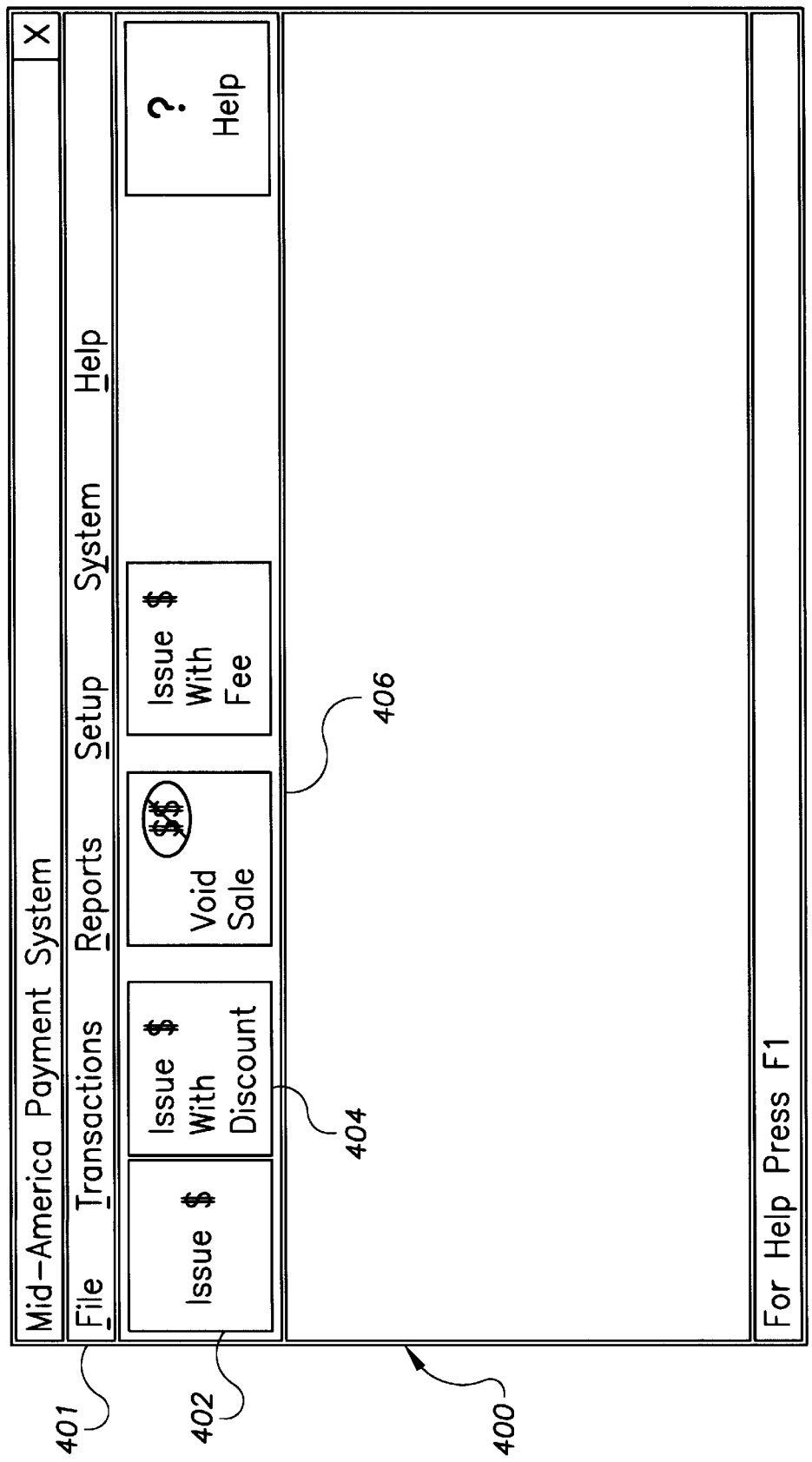
Figures 2B, 2C:
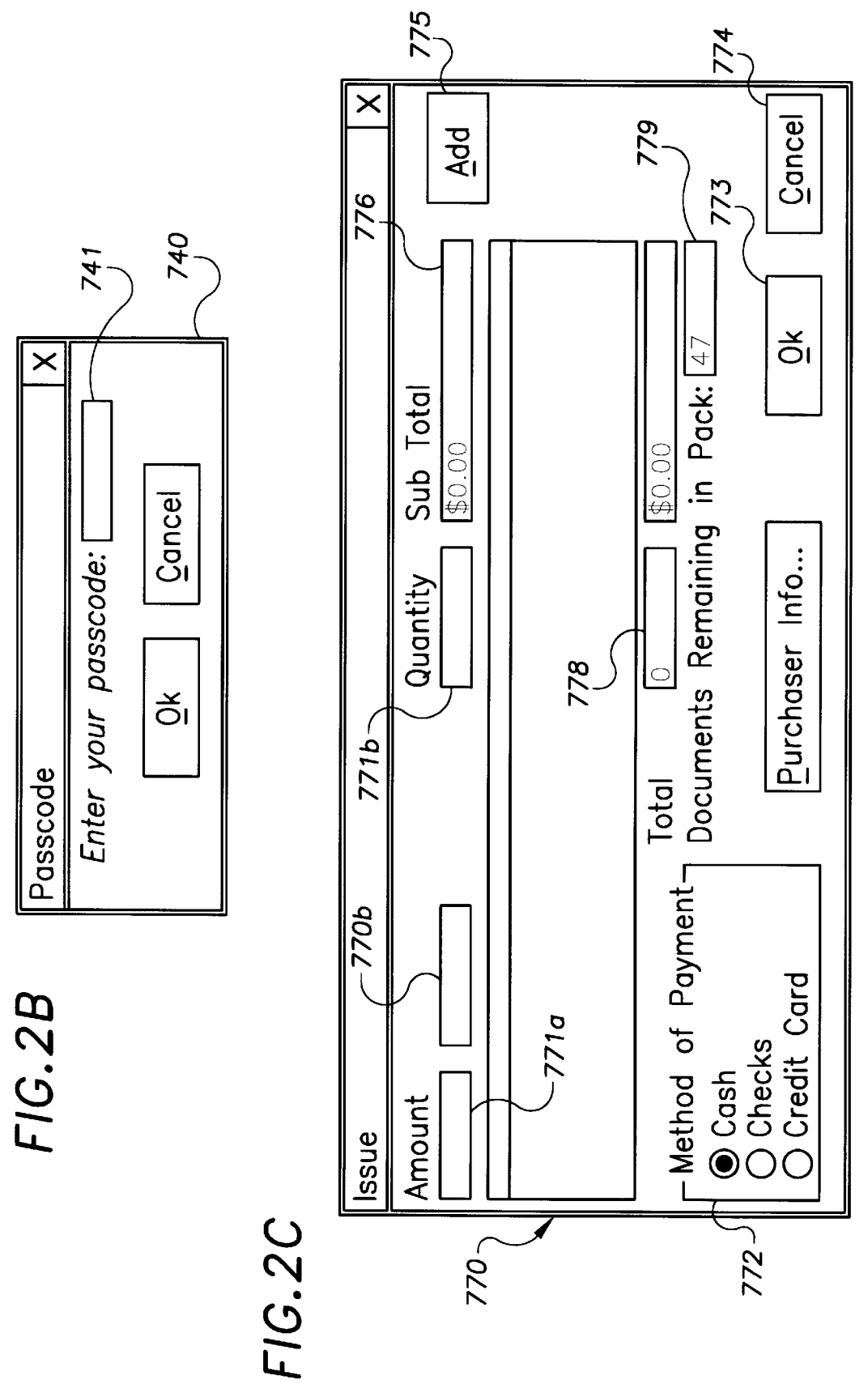
Figure 2E:
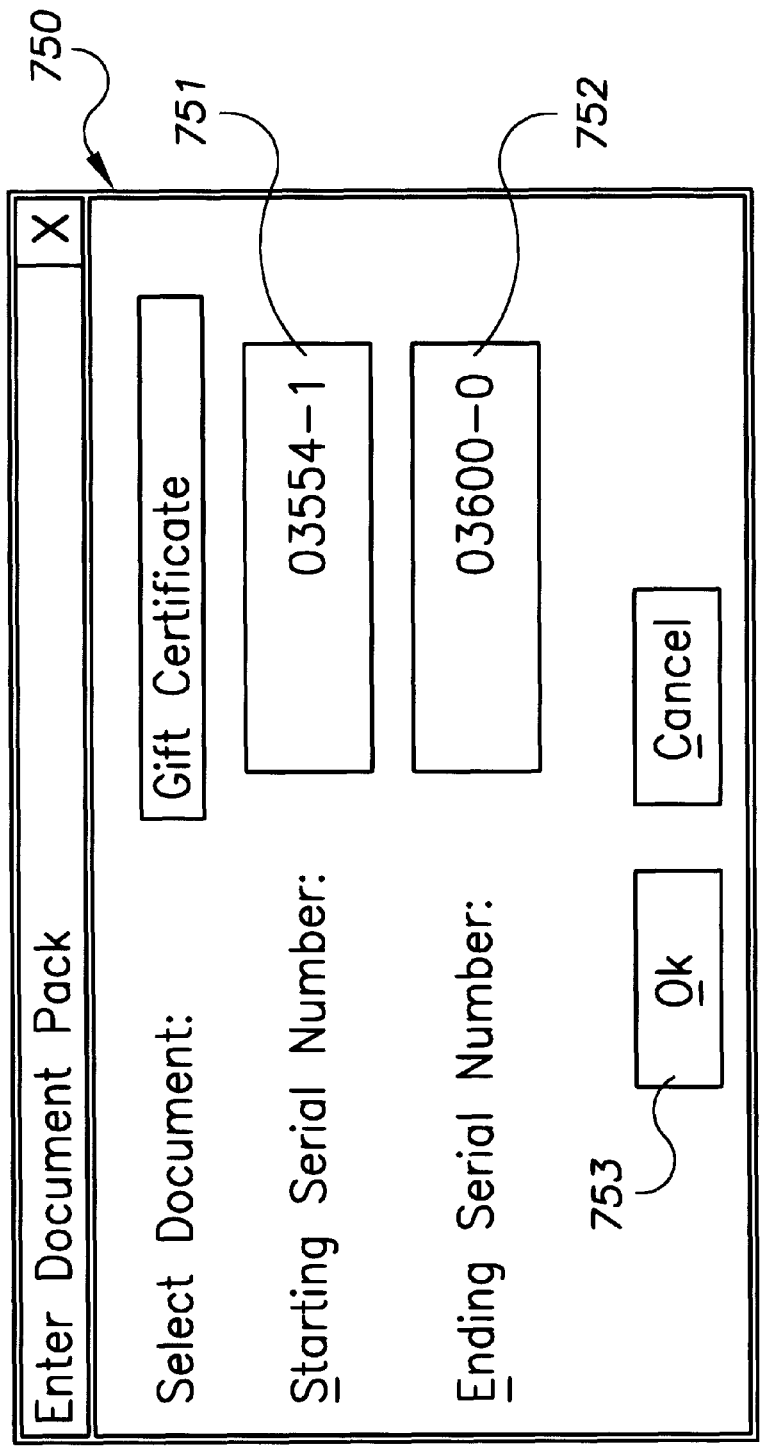
Figure 2F:
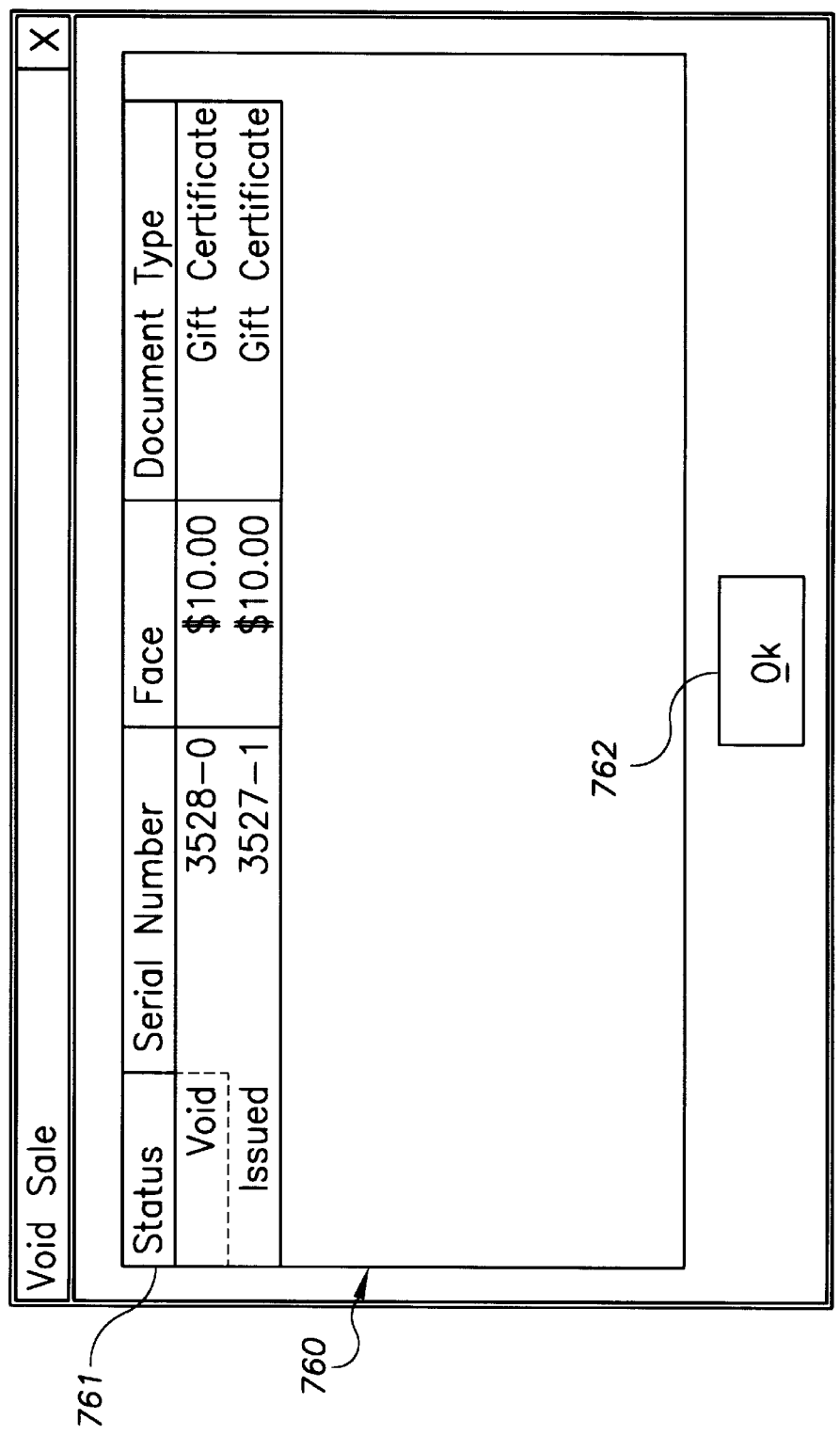
Figure 2G:
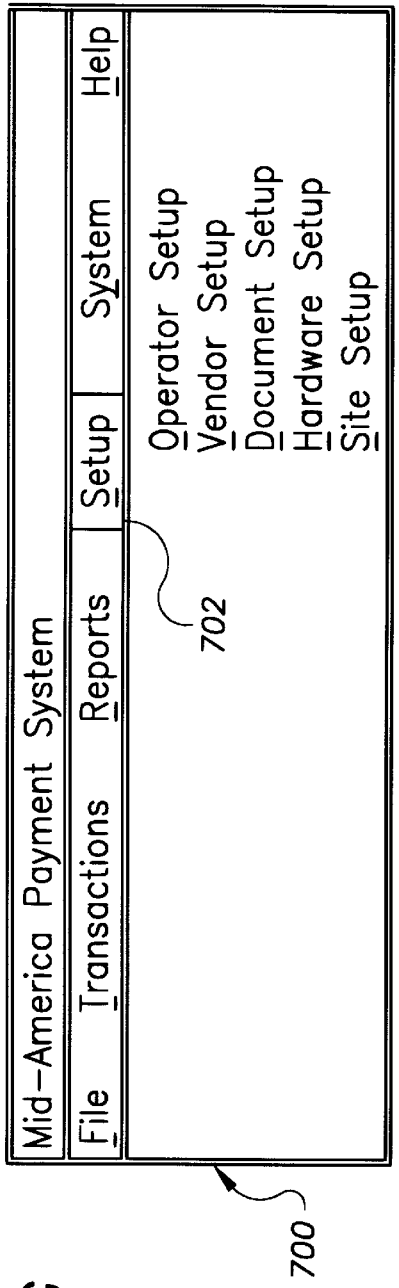
Figures 1, 3A:
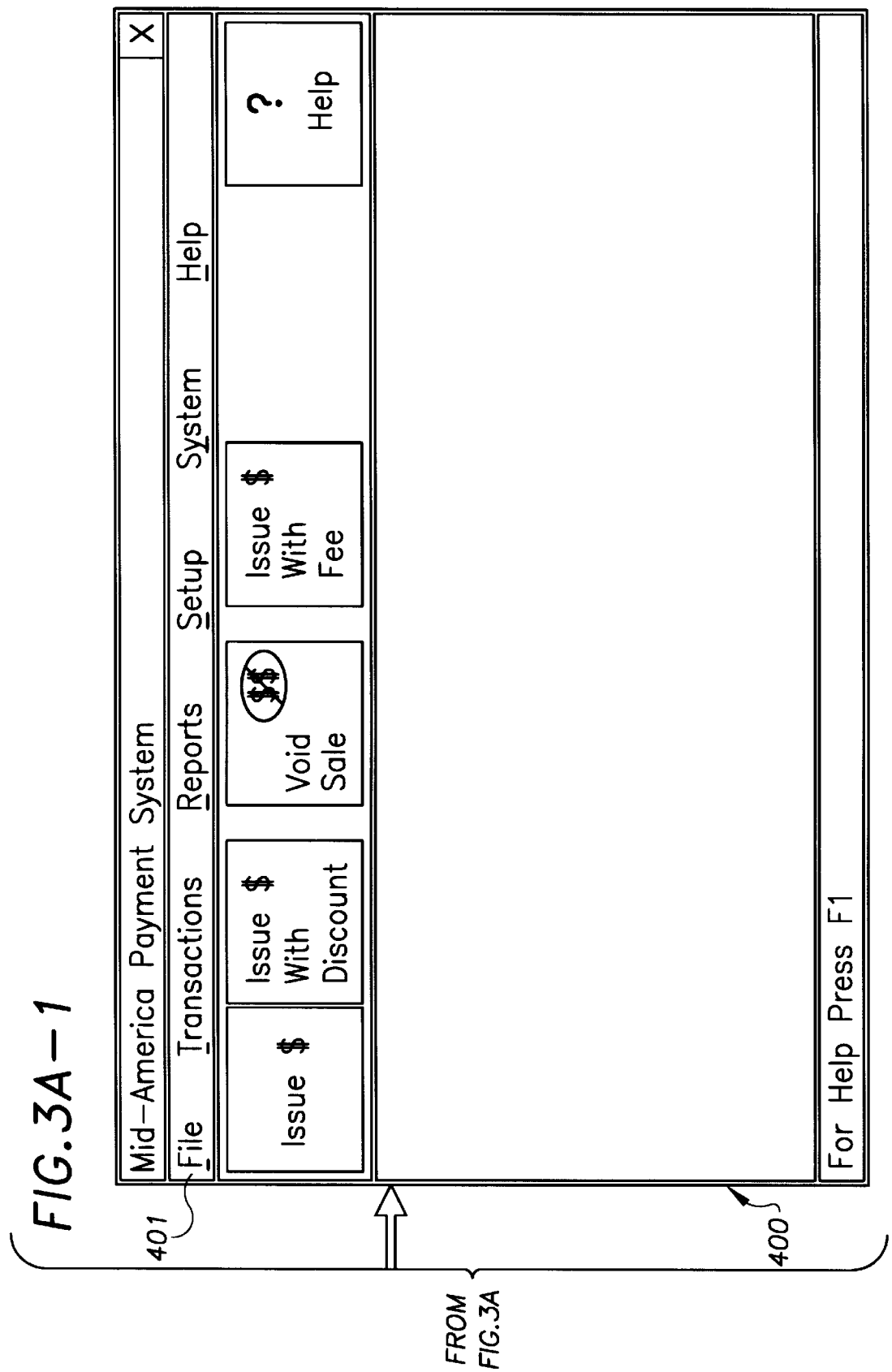
FIGS. 3A–3D are flow diagrams for the initial set up and storage of the operators name and pass codes within the system tied to certain illustrations of appropriate major screens.

Once the system is properly installed and energized, a default or start screen 400 as depicted in FIG. 2A is shown on the monitor. While there are numerous operations that can be initiated from start screen 400, initially a set-up sequence for establishment of operators is required. The set-up sequence that is initiated from the start screen 400 is best described in reference to FIGS. 3A, 3B, and 3C in which the names of the various operators are to entered for the first time. A key or control diskette 20 (seen in FIG. 1) is manually inserted into the floppy disk drive of the computer 12 as shown in Insert Key 102. Such a key diskette 20 is required for certain operations of the system and is generally kept in place of limited availability for supervisory personnel imbued with the responsibility of changing or setting up operators and other system parameters. Without use of the key diskette 20, the system will not permit any change to significant and specified parameters such as, for example, the addition or deletion of operators of the system, changes to pass codes, and changes to the upper limit of the value of the documents to be purchased. Following insertion of the key, the main routine of this operative sequence may be initiated and the first screen seen is Screen 400 (enlarged version in FIG. 2A). The operator selects Set Up from the top menu 401 as Select Set Up 104 in the flow chart. This causes Set Up Screen 700 (also seen in FIG. 2G) to appear.

Figure 2H:
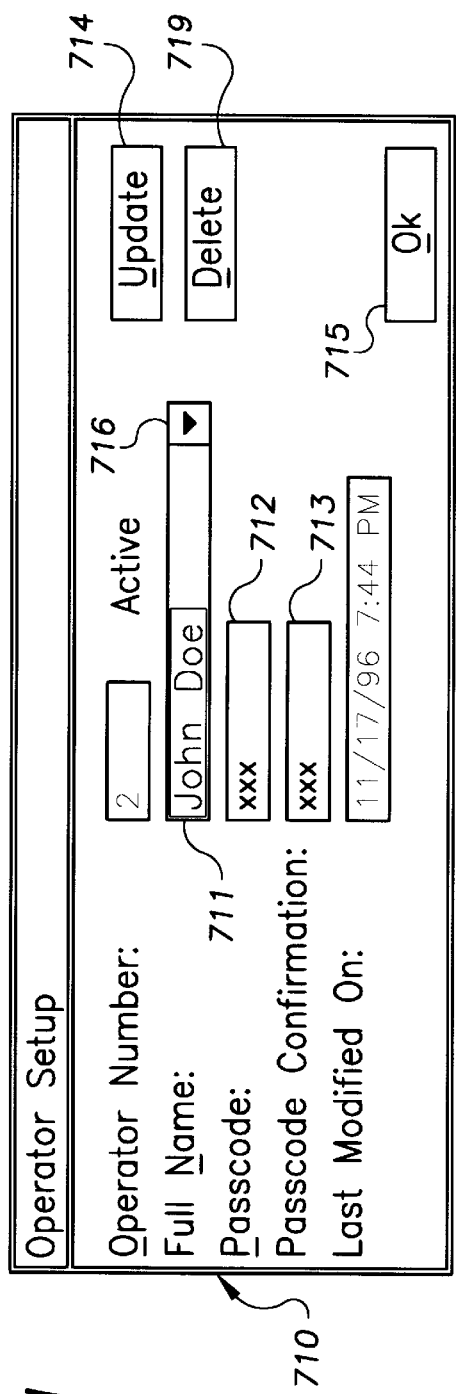
Figure 2I:
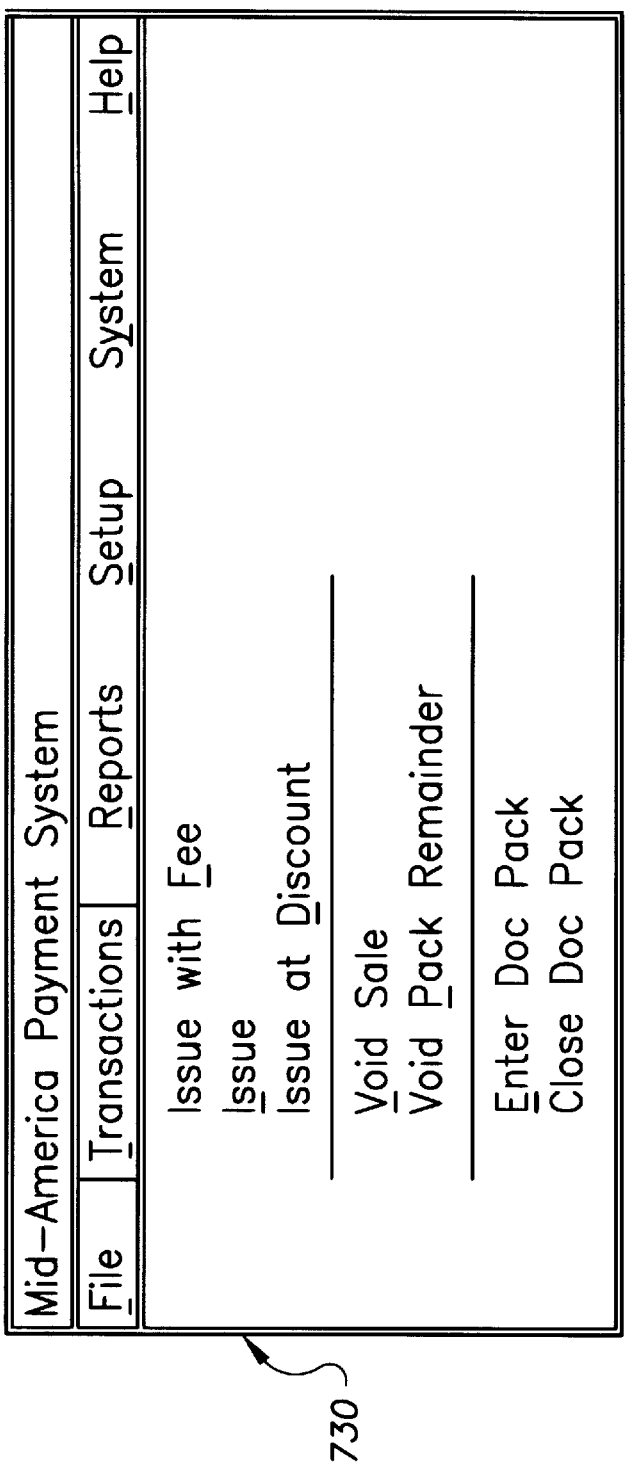

To initially input operator names/pass codes or alter or delete operator information, the operator setup menu 702 is selected at select 106 and screen 710 (FIG. 2H) appears, but only if the system determines that the appropriate key diskette 20 has been inserted as shown at decision 107. Assuming acceptance of the key, one of three subroutines can be initiated. If operators already have been previously entered, then the delete field is shown on screen 710 and a delete-operator subroutine can be initiated noted by branch "1" as discussed which leads to the subroutine illustrated in FIG. 3C. Similarly, the pass codes can be updated for selected operators in an update subroutine depicted by branch "k", also discussed below in relationship with FIG. 3D. The subroutine "i" for initially establishing the operators is described below.

Figure 3B:
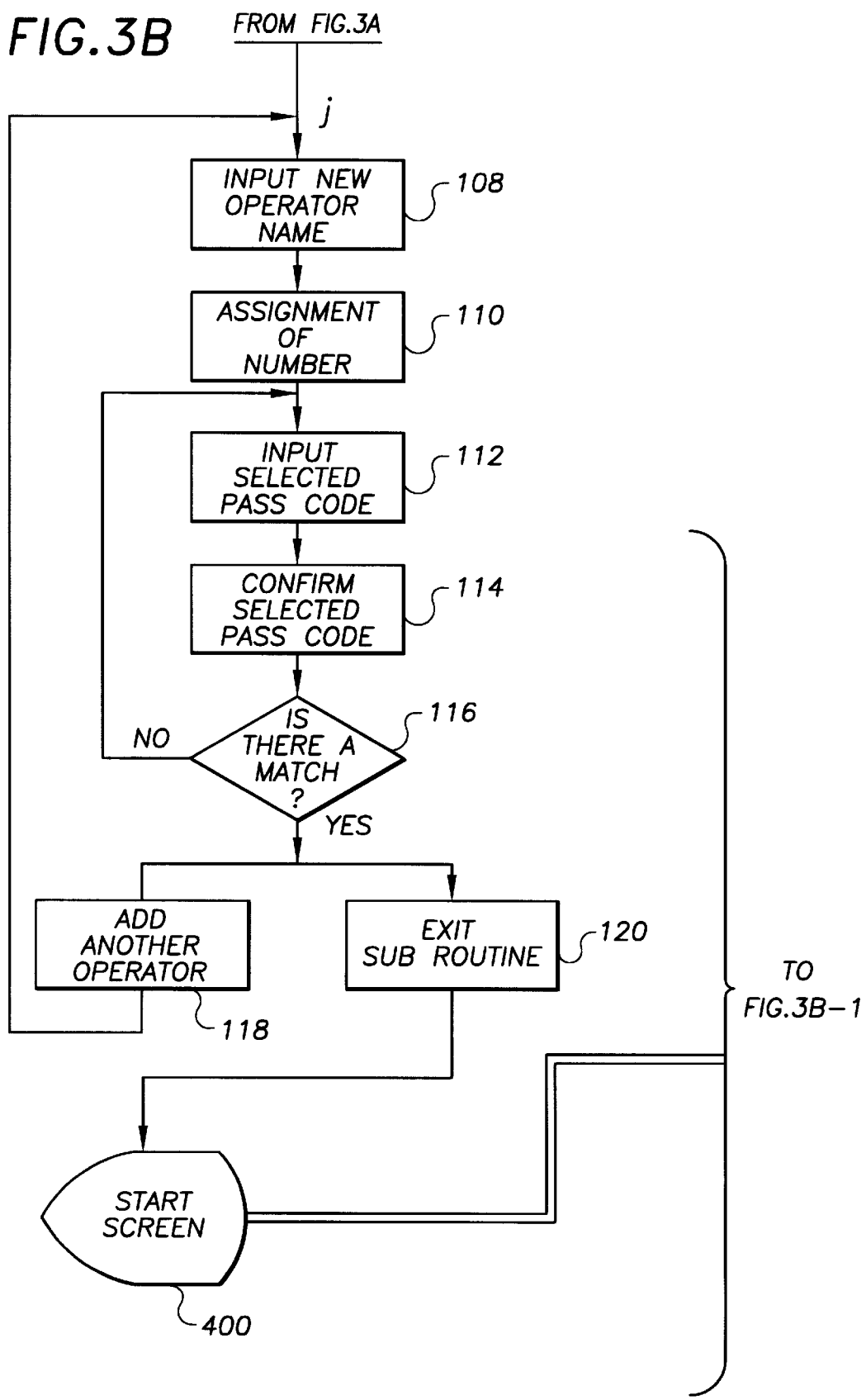
Figures 1, 3B:
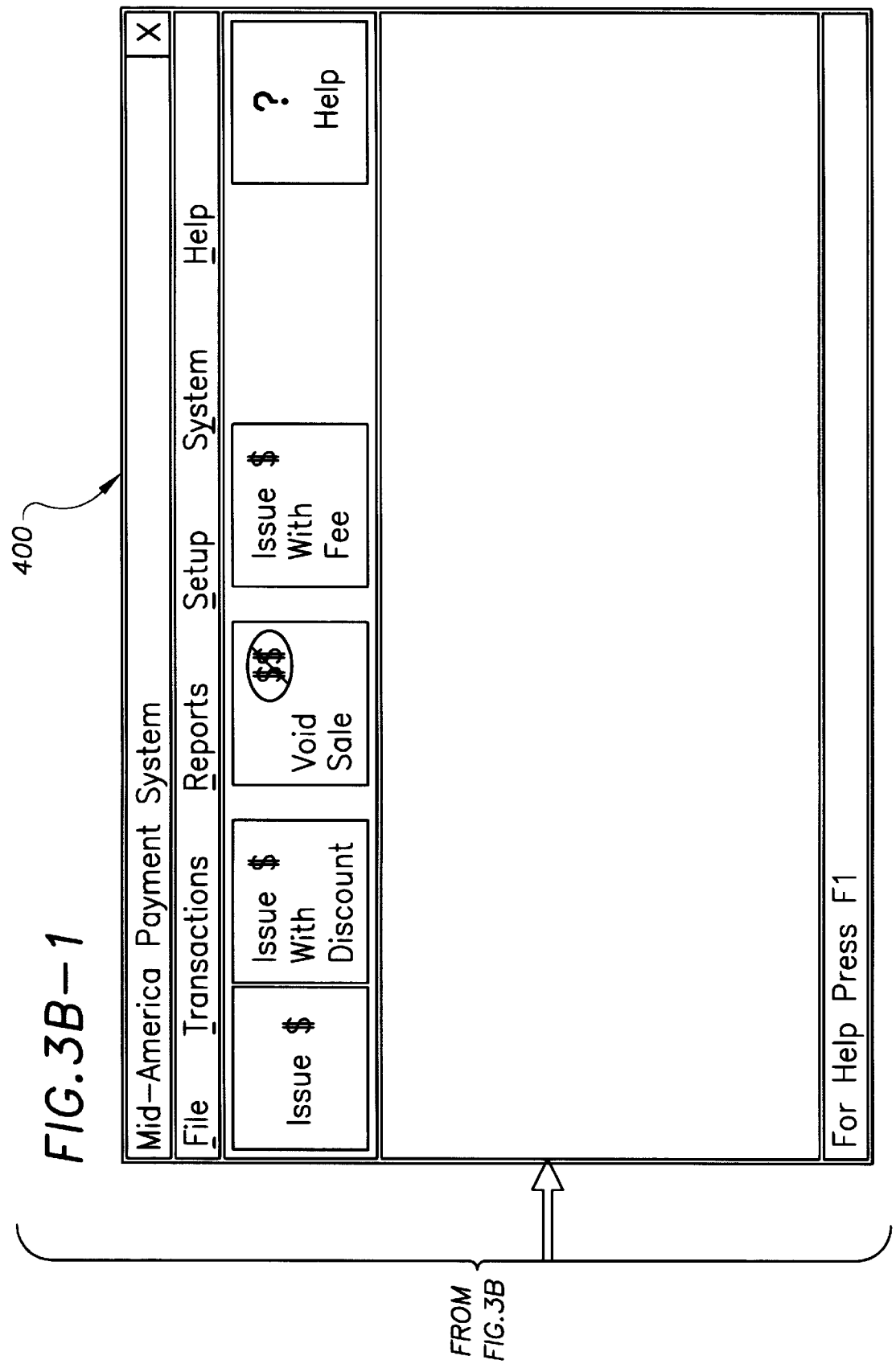

The initial subroutine "i", illustrated in FIG. 3B, starts with the typing (Input 108) of an operator's name in the operator name field 711 and tabbing to the pass code field 712 whereupon a number is assigned automatically for that operator at operation 110 and thereafter will appear in field 717. A selected alphanumeric pass code is typed as shown by Input 112 into the pass code field 712. The pass code is confirmed by again typing the code in confirmation field 713 as Input 114. If there is a match (Yes) at decision 116, then the routine can be continued by choosing the add button 714 as Selection 118 or the subroutine can be exited by hitting the OK button 715 (selection 120) and Screen 400 reappears as the default screen. Selection 118 returns the subroutine to screen 710 and further operator names and pass codes may be entered as described above.

Figure 3C:
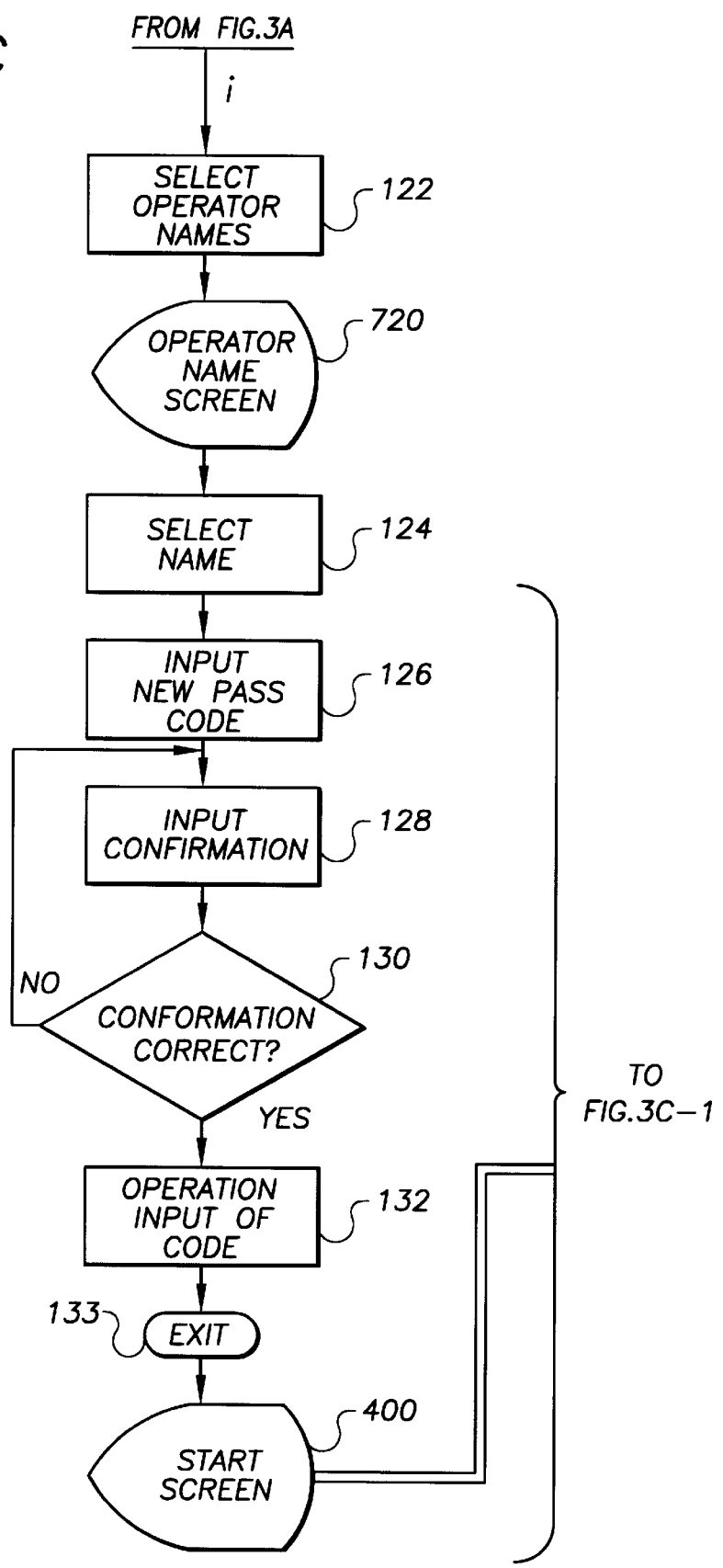
Figures 1, 3C:
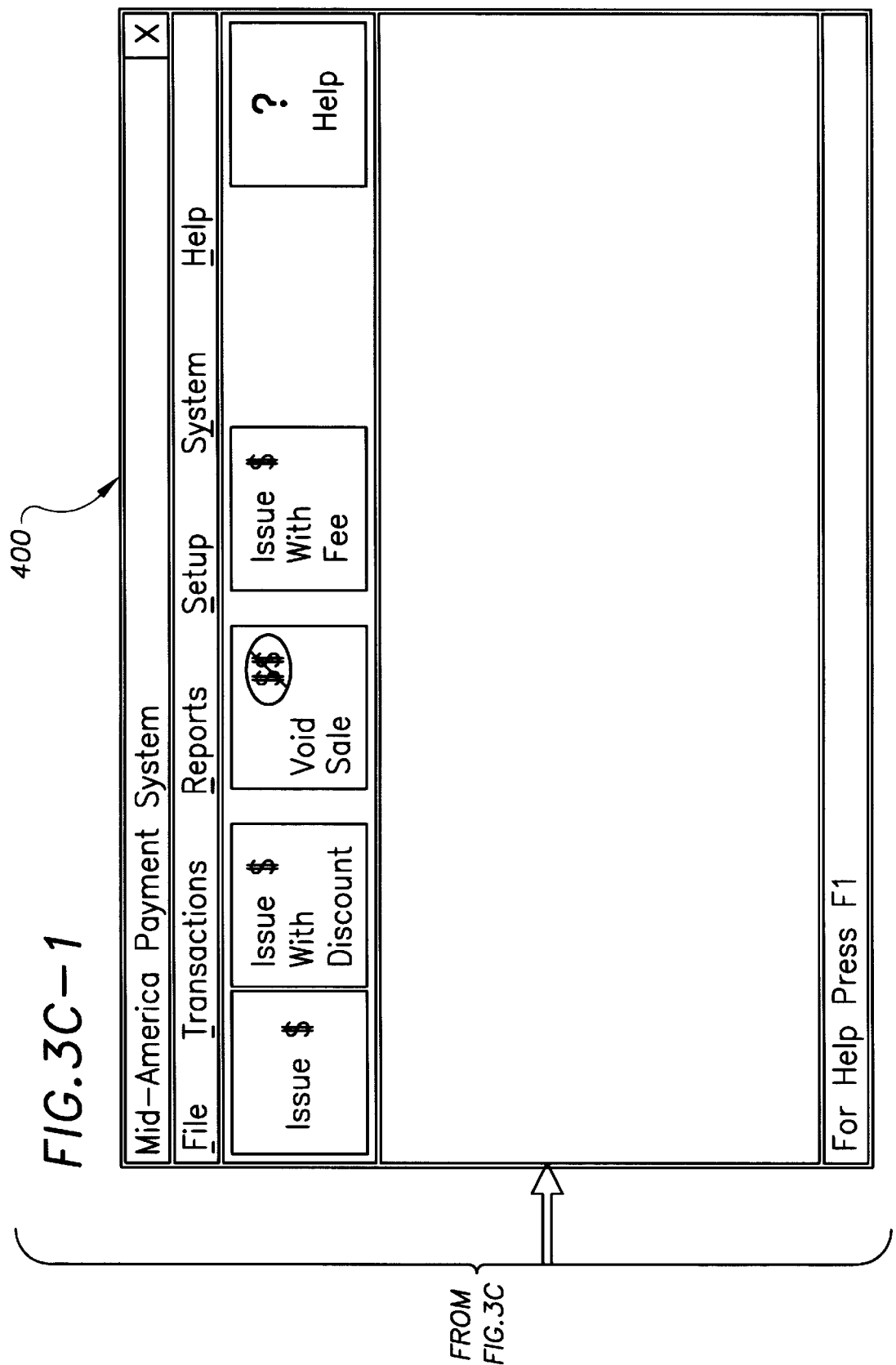

A second sub-routine of this sequence, branch "I", as illustrated in FIG. 3C, allows the updating of the pass words of the operators by first going through the Operator Setup Routine as discussed above until the Operator Setup Screen 710 is reached. An operator name menu is selected at Selection 122 by operating the pull down arrow 716 adjacent the operator name field 711 in Screen 710 and an operator name screen 720 (not separately shown)appears, listing all operator names that have been previously entered. The name of the operator whose pass code is to be changed is selected from the screen 720 at Selection 124. Once the name is selected, Setup Screen 710 reappears and a new pass code entered into the pass code field 712 as indicted by Input 126. This is followed by confirming the new pass code at confirmation 128. If there is a match or Yes at Decision 130, then the new pass code is entered by the system at Operation Input 132 by hitting the add, now shown as the update button 714. The subroutine can be exited as before by hitting the OK button 715 depicted as Selection 122 and Start Screen 400 reappears.

Figure 3D:
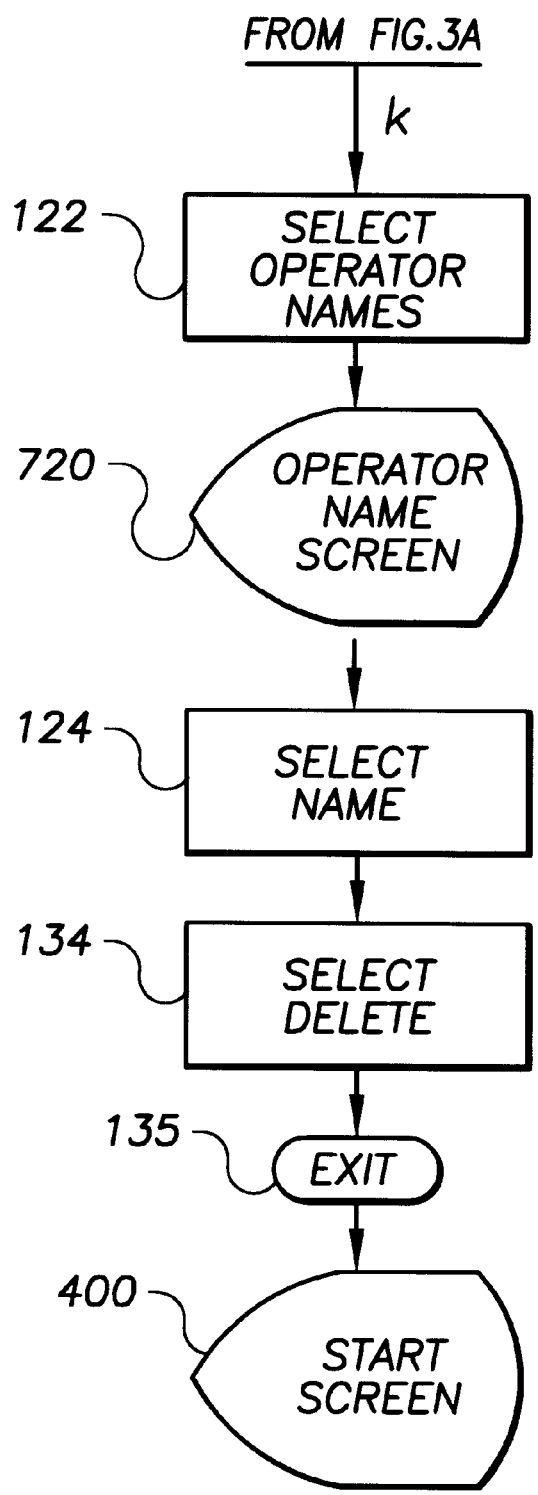

A third sub-routine "k" of this sequence, illustrated in FIG. 3D, permits the deletion of an operator's name. The sub-routine initially follows the same sequence as the sub-routine for updating by selecting the operator name menu at Select 122 and obtaining the operator name menu in Screen 720. Following selection of the Operator name at Select 124 and a return to Operator Setup Screen 710, the name can be deleted by hitting the delete button 719 (Operation Input 134) which causes the system to delete the selected operator. The deletion will no longer permit the pass word for that operator to initiate the operation of the system. However, the name of the operator will continue to be listed in the operator name menu but indicated as being inactive. As before with the other subroutines, this subroutine can be exited by selecting the OK button 715 (as Select 135) on Screen 710 and Screen 400 reappears.

Document Set Up Routine and Other Parameter Changes

There are various parameters that are necessarily set at each installation of the system that require the use of the key diskette to install and/or change the parameters. These parameters include, but are not limited to, changes to the operator list and pass codes, enablement and dis-enablement of the various options for transactions, the time of the close of the day's transactions, the maximum dollar value that can be given to each document, the upper number of the range of blank documents that are entered into printer, and the various time intervals that reports are polled and made to a central receiving device over available communication channels. For changes to the allowed parameters of documents, the key diskette is inserted and the site setup screen and its menu can be gained by clicking Setup in the Start Screen. The Document Setup item when clicked will provide a Document Set Up Screen (not separately shown) that allows the supervisor operator or other designated personnel to change the parameters of the documents. Clicking the Site Set Up item will gain access to a Site Set Up Screen (not separately shown) that will permit changes to polling times for reports and closing times for the day's activities.

Similarly, following insertion of the key diskette, the System item in the Start Screen can be clicked displaying the System Screen (not separately shown). From there Settings can be selected and a Systems Options Screen will appear giving menu selections including Transaction Change and Method of Payment. The Transaction Change menu item when selected permits the supervisory personnel to change the calculations for discounts and other changes. The Method of Payment menu item when selected permits the supervisory operator to enable or disable various types of payment options as will be discussed below.

Entering Document Pack Routine

Figure 4A:
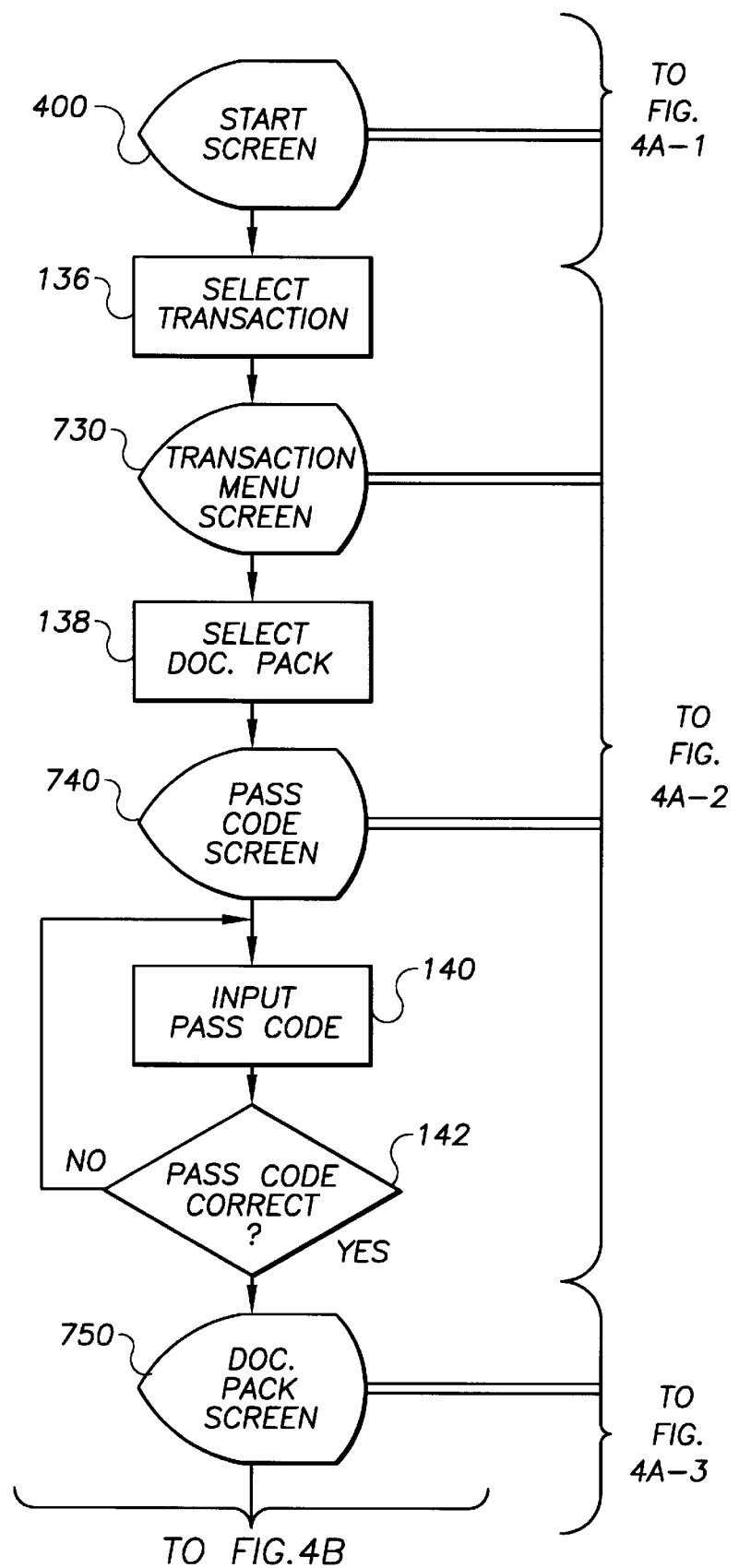
FIGS. 4A and 4B are flow diagrams for the entry of a new document pack into the system tied to certain illustrations of appropriate major screens.
Figures 1, 4A:
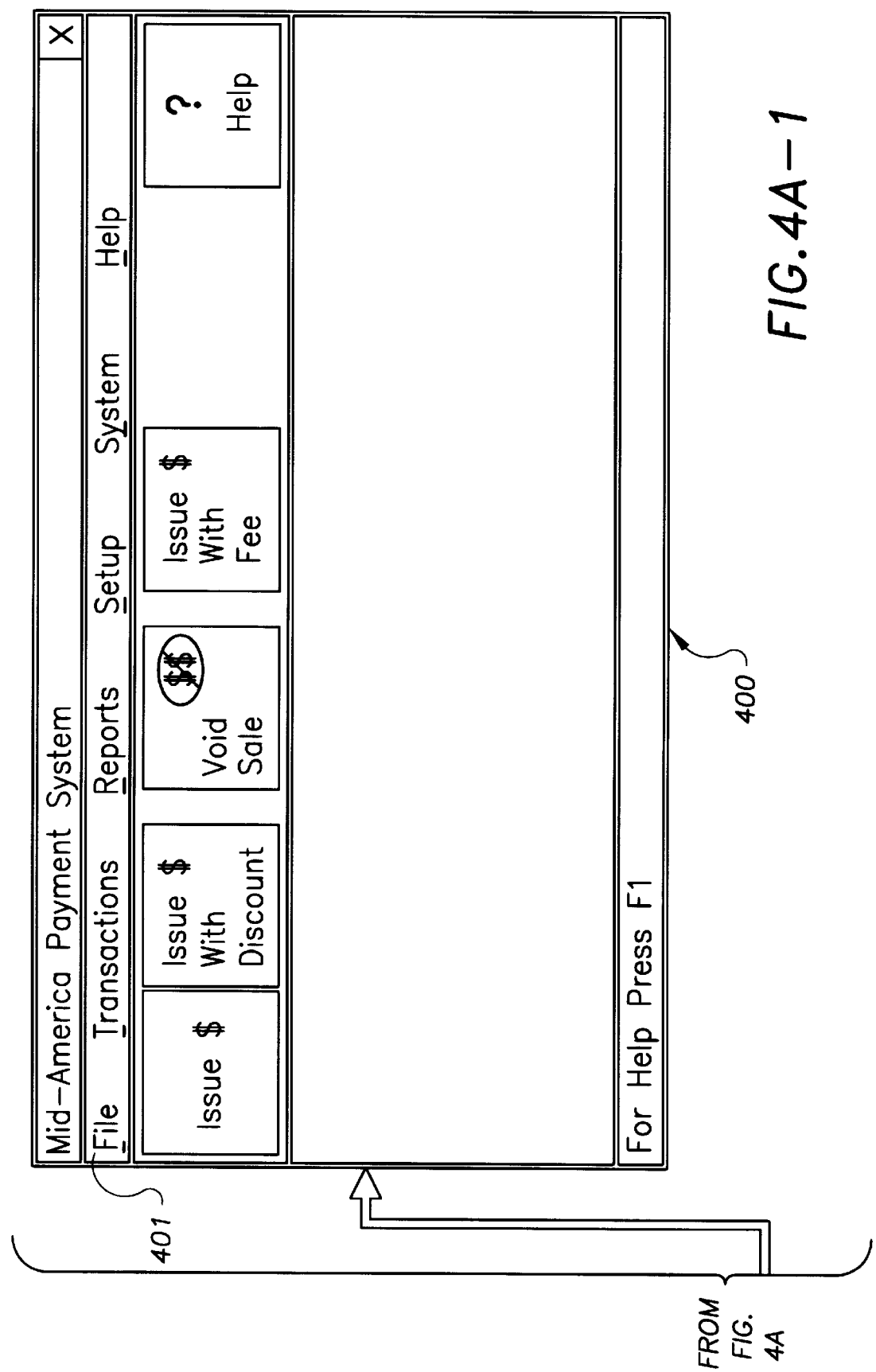
Figure 4B:
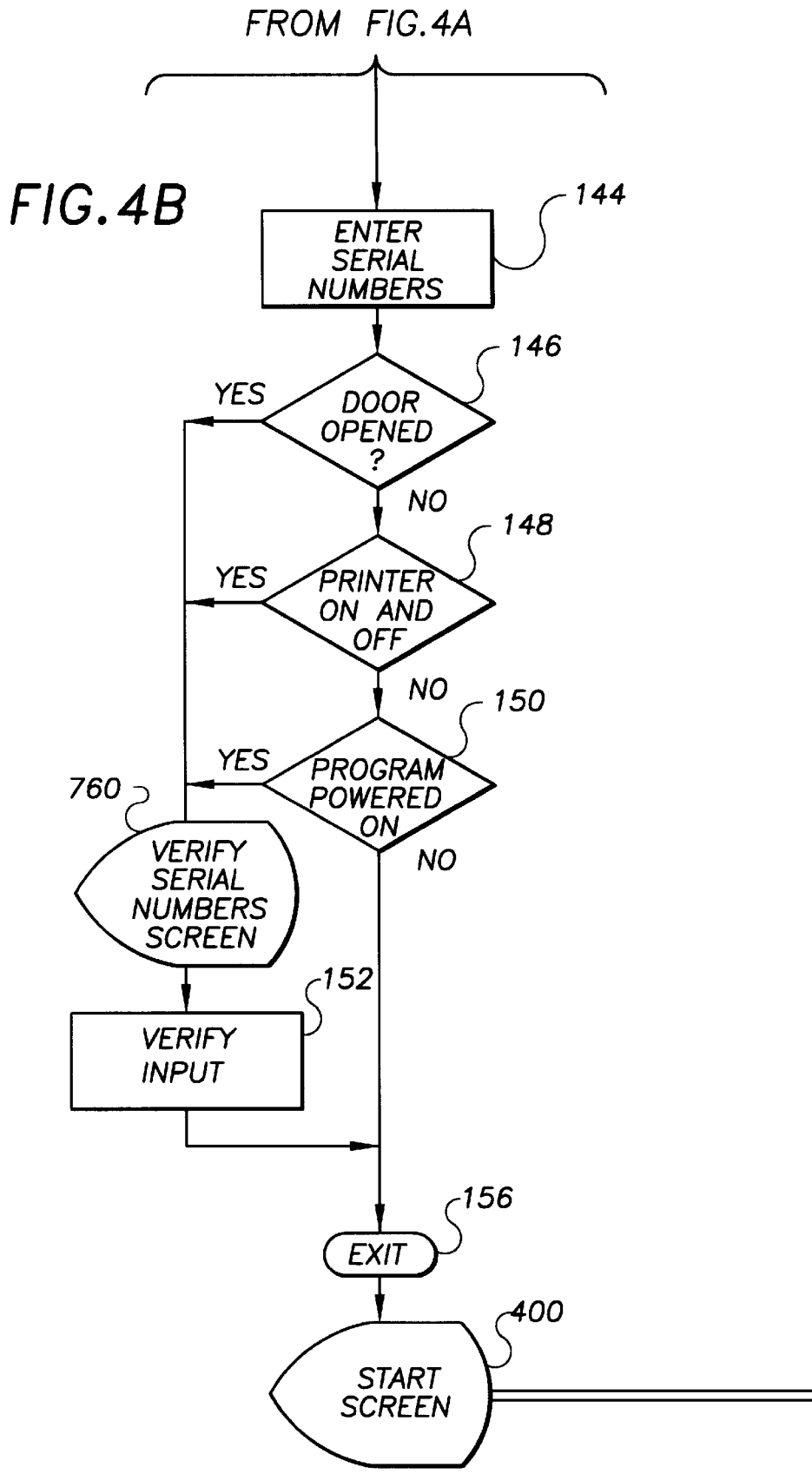
Figures 1, 4B:
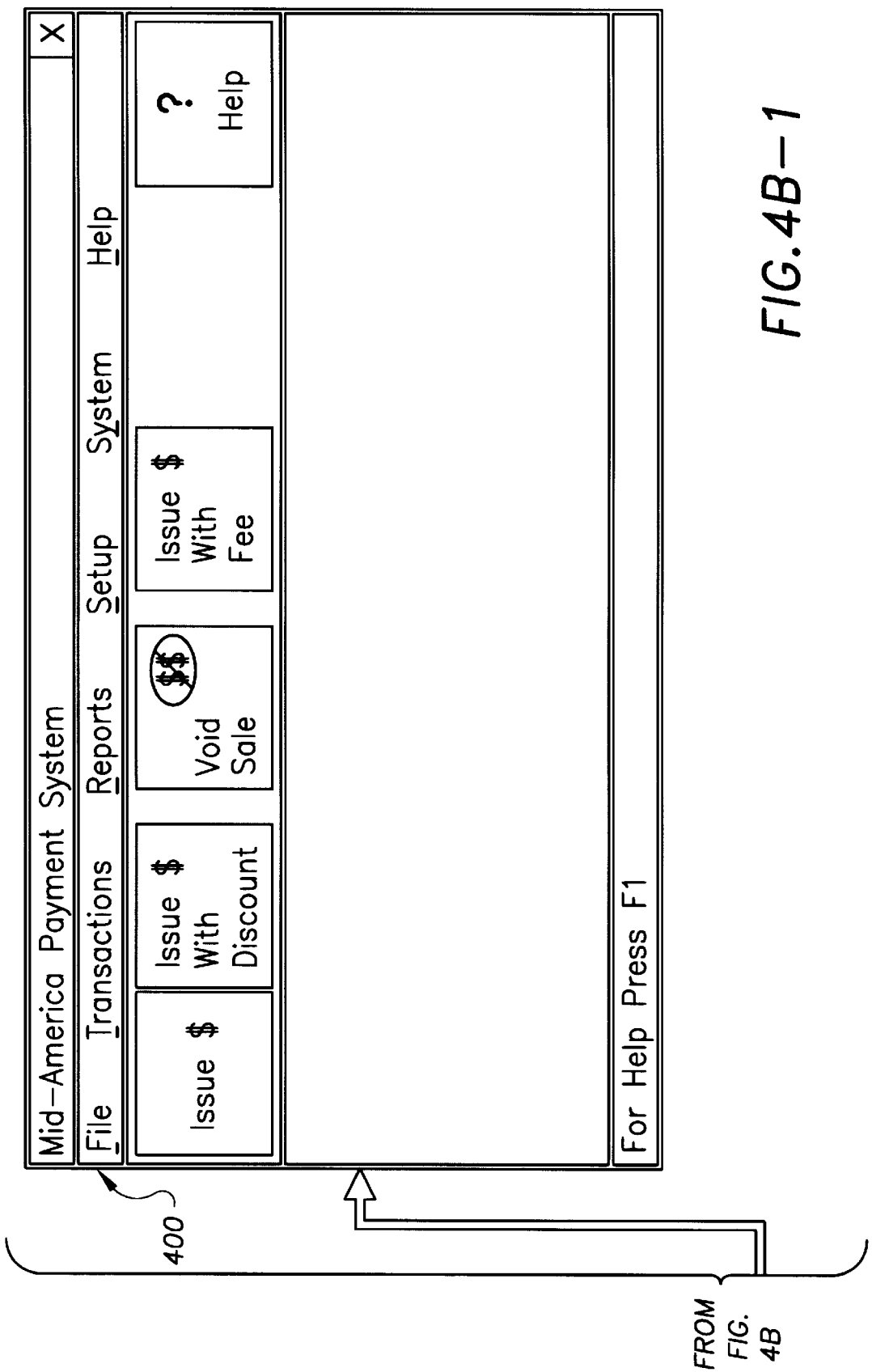

Reference is now made to the flow charts of FIGS. 4A, 4B, and 4C in which the various subroutines for initially entering information concerning the gift certificate forms or documents loaded into the printer are illustrated. By selecting Transactions from the bar menu 401 (Select 136 in the parallel flow chart) from the Screen 400, the Transaction Menu Screen 730 (also shown in FIG. 21) appears providing a menu of various transactions that can be chosen, such as, for example, the issuing of documents (branch "a"), discounting documents (branch "b"), voiding documents (branch "c"), and entering documents. For this portion of the discussion, a new document package is to be entered and the selection from the menu is Enter Doc Pack as Selection 138 from Screen 730. At this point, the Pass Code Screen 740 (also shown in FIG. 2B) appears and the operator enter his or her pass code in the pass code field 741 illustrated as Selection 140. If there is a match at Decision 142 or YES, the Document Package Screen 750 (also illustrated in FIG. 2E) appears, enabling the operator to enter the starting and ending serial numbers of a sequence of documents in the proper fields 751 and 752, respectively, as indicated by Input 144. The system will flash a Verification Required Screen 760 (not separately shown) if the system detects an extraordinary event such as a printer door that has been opened, a printer that has been powered off and turned back on, or the system itself has been turned off and then on. Each of these decision points are depicted by respective Decisions 146, 148, and 150. Simply, the system algorithmically compares the entered digits to determined if the entered beginning number is less than the entered ending number and compares the range established for the numbers with the pack size of the documents. If the entered numbers do not fit the comparison, the system flashes an error signal and will not allow further processing until the proper numbers that fit the comparison are entered. The system requires a verification input of the serial numbers (Input 152) upon YES from any of the Decisions 140, 142, and 144. If the system either did not detect such an event or NO or determines verification has occurred, the subroutine returns to Screen 750 and the serial numbers become entered into the system as indicated by Operation 154. This subroutine is exited by clicking the OK button 753 as Select 156 and screen 400 reappears.

The simple verification routine as set forth above avoids later problems involving the transactions where an out-of-sequence number might be used in to complete a transaction. This would require laborious time consuming investigations of costly personnel to identify the aberration in the records caused by the erroneous entry. Many prior art systems would use bar code and reader hardware to address this problem, thus adding greatly to the cost of the total system. By providing this simple software solution to address the problem, the use of bar codes imprinted on the documents and expensive reader hardware is avoided.

Issuing Documents

Figure 5A:
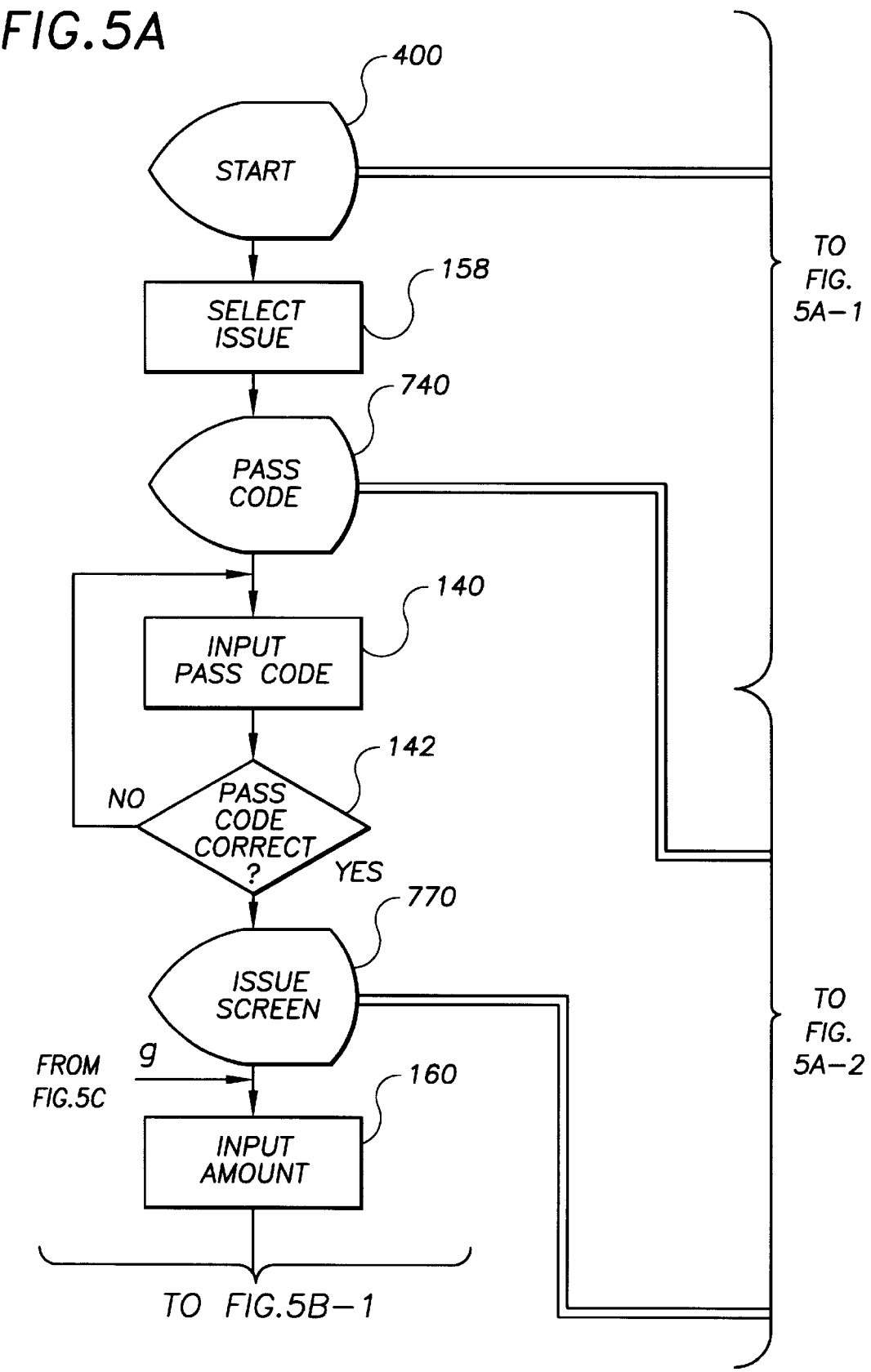
FIGS. 5A–5C including 5 B1 and 5 B2 are flow diagrams for the preparation and dispensing of customized document in accordance with the system of the present invention tied to certain illustrations of appropriate major screens.
Figures 1, 5A:
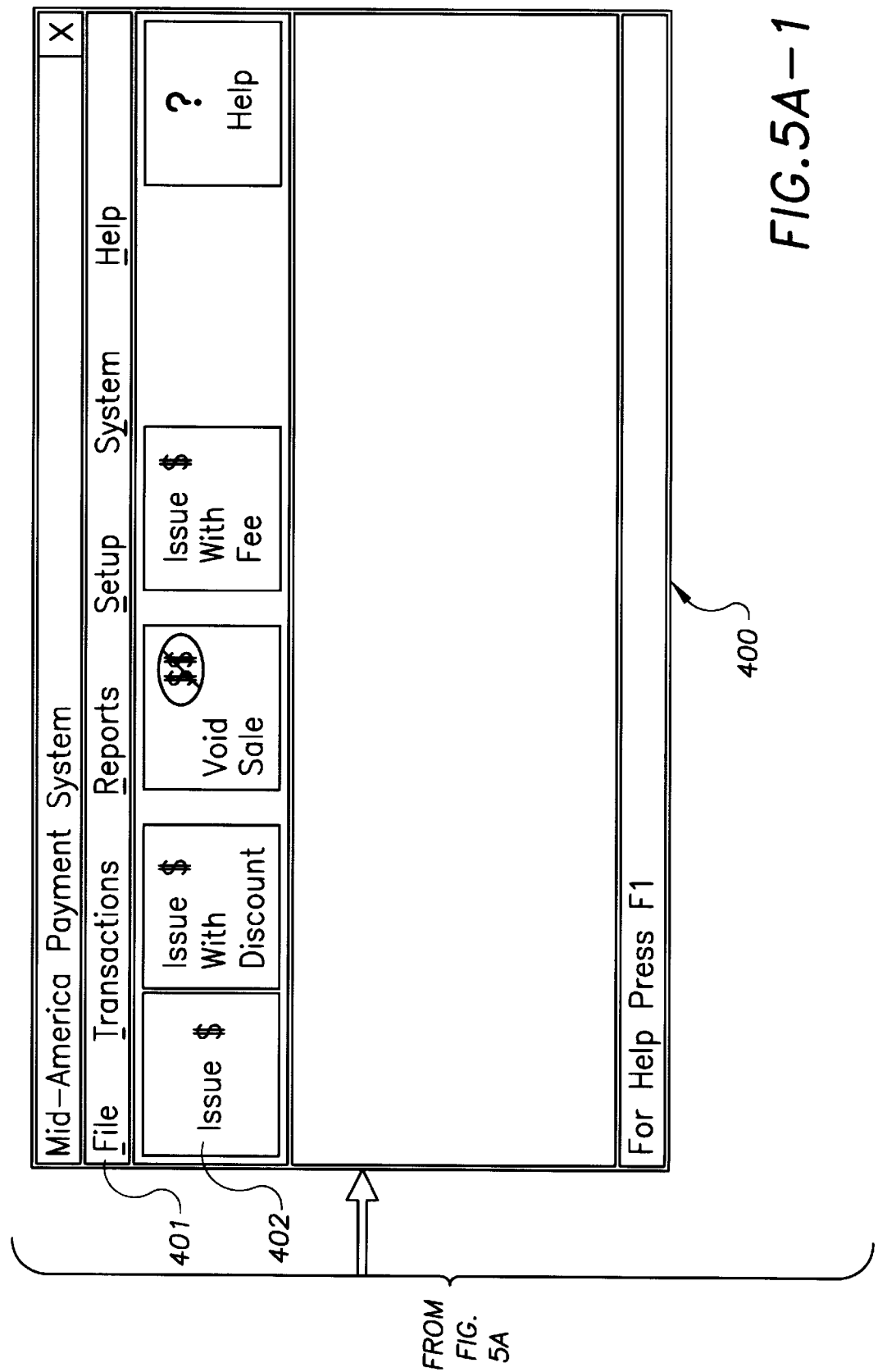
Figures 2, 5A:
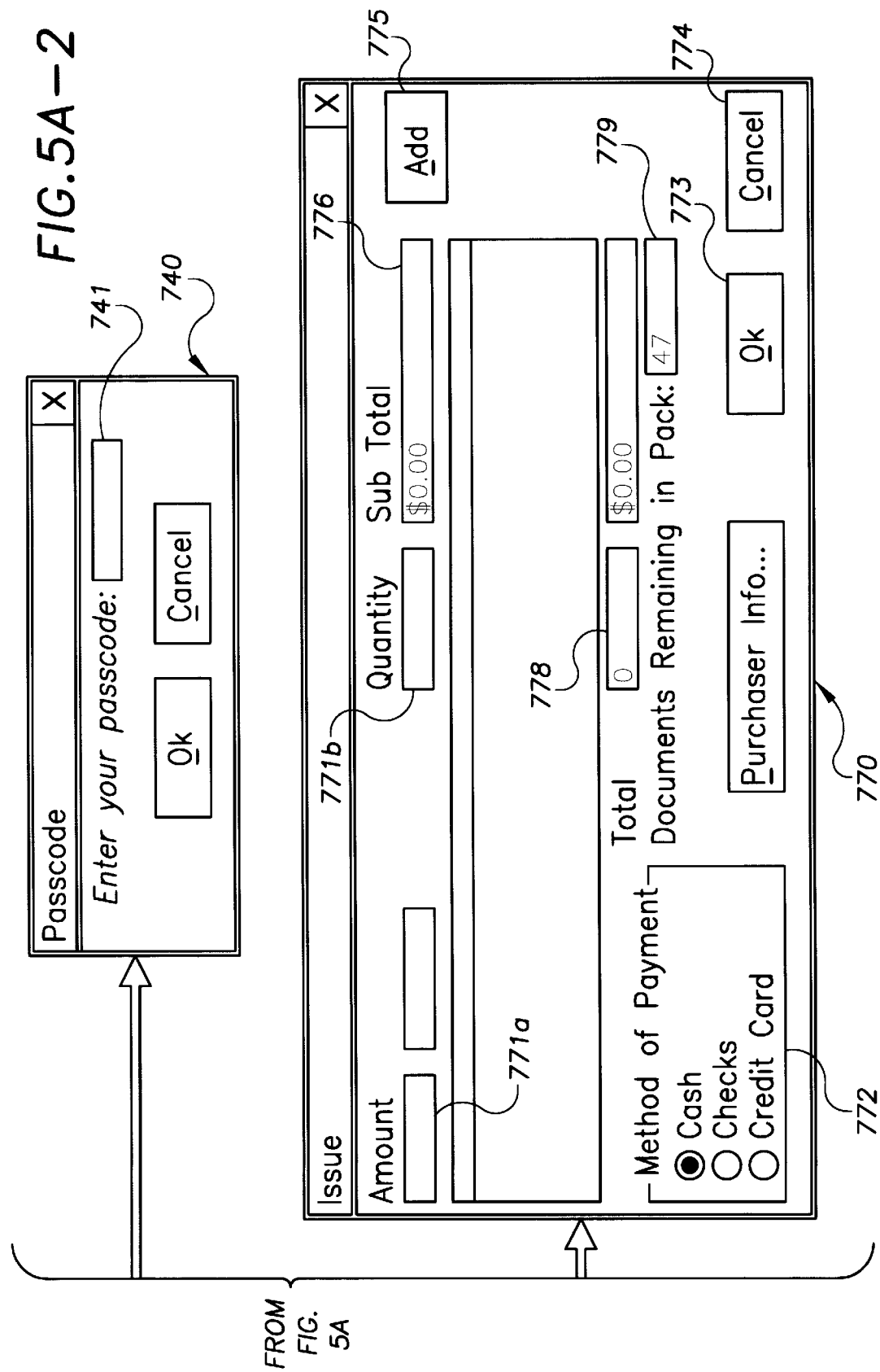
Figures 1A, 5B:
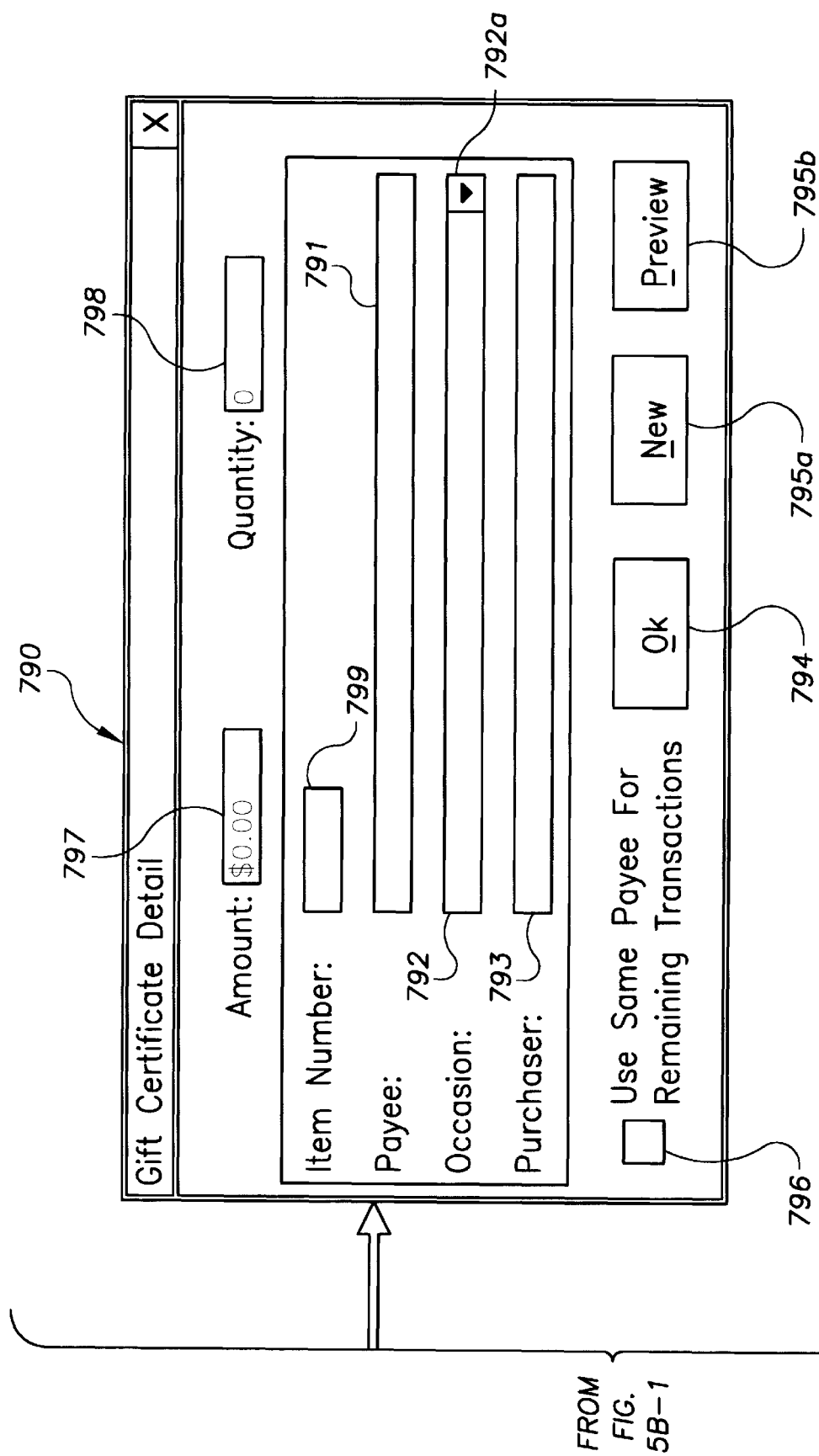
Figures 2, 5C:
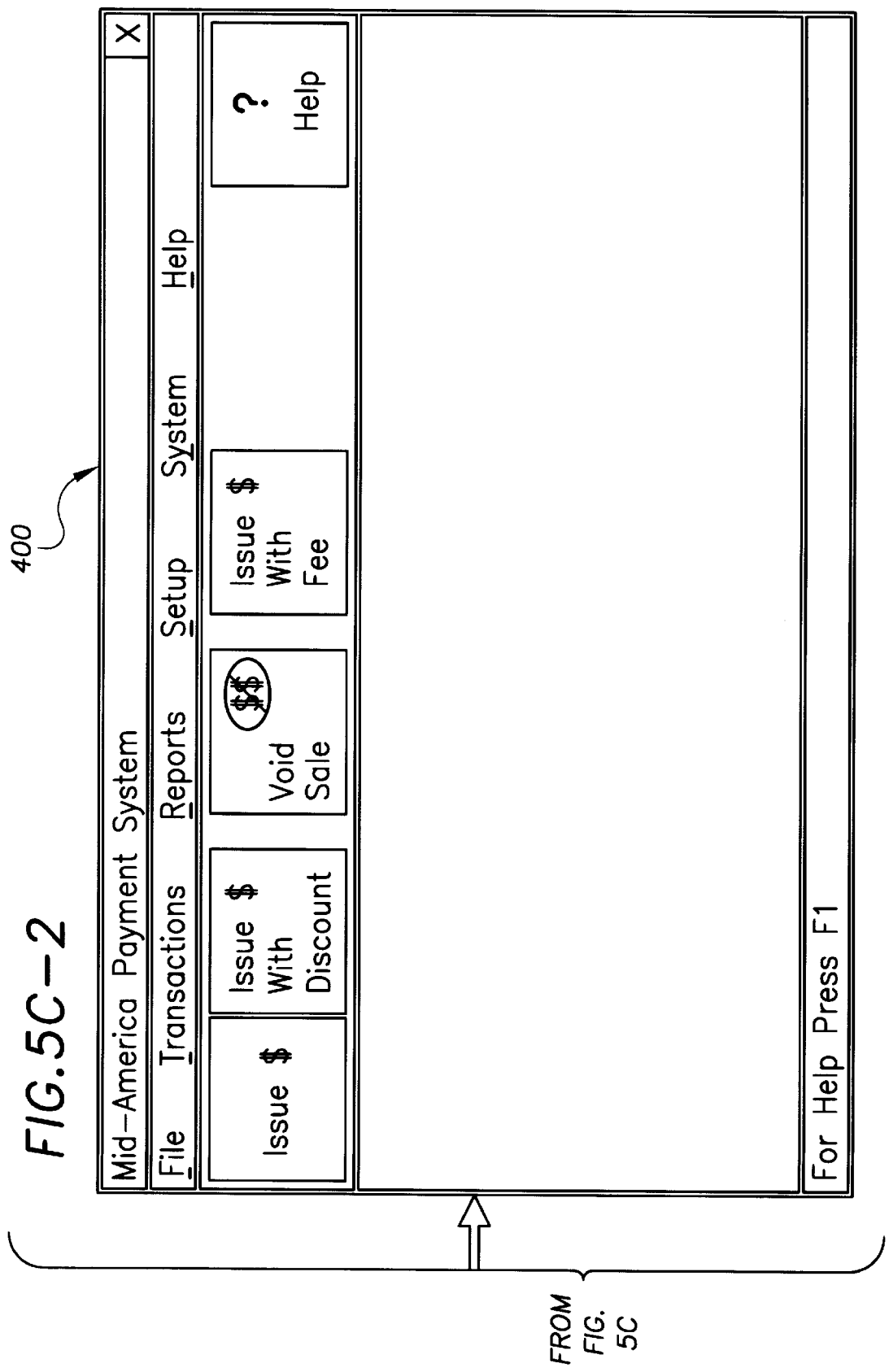

The issuance of documents is best described with respect to the flow charts of FIGS. 5A, 5B, and 5C along with the depictions of the various screens in FIGS. 2A–2D. Where possible to ease reading, the details of the major screens are depicted in parallel sequence with the various described routines. As before, the routine begins with the default or start screen 400. While Transactions could be selected from the top bar menu 401 of the Screen 400, resulting in the appearance of the more detailed Transaction Screen 730 (see FIG. 21), the Screen 400 conveniently permits the operator to go directly to the issuance of documents. Thus, by the selection of the issue button 402 (Selection 158), the Pass Code Screen 740 appears. As with all operations of this system requiring pass code authorization to initiate operation, the pass code is inputted by typing it in field 741 (Input 140), matched at Decision 142, and if Yes, Issue Screen 770 appears (also illustrated in FIG. 2C in enlarged form). As can be seen in the Screen 770, there are (a) input fields for the entry of the amount 771a and quantity 771b, (b) selection buttons 772 for the type of payment, namely, cash, credit card, or check, (c) selection buttons for exiting 773, canceling 774, and adding additional documents to be issued 775, and (d) operational fields for automatic calculations of subtotals 776, totals 778, and the number of unissued documents remaining in the installed package of documents 779.

The operator, upon ascertaining the amount that the customer wishes to expend for the particular document, types that amount into the amount field 771a as Input 160. The system then determines whether or not the amount exceeds the predetermined amount limit for a particular document at Decision 162. If YES, an Exceeds Limit Screen 780 momentarily appears (not separately shown) and screen 770 reappears. The operator must then adjust down the entered amount in field 771a at Input 160. If NO, the operator tabs to the quantity field 771b, thus entering the amount (Operation Input 164) and ascertains from the customer the number of documents to be purchased. This number is inputted into the quantity field as Input 166. At any point in the routine, the operator is always aware of the number of documents remaining in the printer by viewing field 779. The system automatically tracks the number of unpurchased documents. Should the number not be sufficient for the amount being purchased, the system provides the flexibility to enter new documents at the appropriate interval by the same routine as described above. As stated above the operator will know at all times how many blank documents are left in the printer and can determine when to cease operation and load a new set of documents in to the printer following the procedure for loading documents as discussed above. Verification will clearly be required as the printer will be opened and closed for loading purposes.

Assuming, however, that no loading is required in the particular transaction at hand, the routine continues with the operator tabbing to the add button 775. and system enters the number and calculates the subtotal in Operation 170. Once the amount and number of documents have been determined, the operator ascertains if the customer wishes to personalize the document and if so, clicks add button 775 as Select 172 and the Document Detail Screen 790 appears (also shown in enlarged form in FIG. 2D). Screen 790 allows the operator to personalize each of the documents purchased and has (a) fields for the entry of the name of the payee 791, occasion 792, and the name of the purchaser 793, (b) selection buttons for the exiting of the screen and subroutine 794, movement between the selected documents that are to be purchased 795a and 795b, and causing the same payee to be named on all such documents 796, and (c) operational fields for showing the selected value of each document 797, the number of documents that were selected 798, and the item number 799. The item number field displays a number of a document in a sequence of documents of the same value such as where a purchaser is purchasing multiple documents all at the same price. If the customer does not wish to customize the documents, then the OK button 794 is clicked (Select 174) and the subroutine returns as shown by branch "d" back to the Issue Screen 770 for processing of the documents as discussed below. Although the particular order in which the personalization of the documents is accomplished is immaterial, the ensuing discussion of the flow diagrams of FIGS. 5B and 5C with Screens 770 and 790 shown as appropriate sets forth the subroutine as moving from inputting of the purchaser's name, inputting the message, and then inputting the recipient's name. This is for clarity only. The purchaser's name then if first typed in field 793 as manual Input 176. Should personalization be desired with the same recipient named on succeeding documents, the operator clicks the Same Payee (recipient) Button 796 as Select 175 and thereafter the system will default in those succeeding documents to whatever recipient's name is inputted into field 791 in this transaction. This will continue until Button 796 is clicked again. Assuming different recipients are desired on each document, OK button 794 is ignored, but the same routine is followed in both situations as described below. The operator next determines if the purchaser wishes to create a unique message to go on the document or prefers to use an already prepared occasion message. If the latter is desired, the operator clicks the down arrow 792a adjacent the occasion or message field 792 (as Select 179) and the message screen 800 (not separately shown)appears. This screen has previously selected messages for allowing the purchaser to select one that best fits the specific occasion at hand. The operator clicks the selected message as Select 180. Should the purchaser desire to create a message instead of selecting one from the message menu, the operator can type up to 30 characters in the Message Field 792 as Input 182 Tabbing to the Recipient Field 791 inputs this message as Operation 184 and allows the operator to type the recipient's name as a manual Input 186. At this point, the operator can move the routine through any or all of the following options: to the next document to be personalized by clicking the next button 795a (Select 188); to a previously prepared document for review by clicking the previous button 795b in Screen 790 (Select 189); or termination of the personalization subroutine by clicking the OK button 794 (Select 190). As stated above, if the same recipient had been selected for each document, the system defaults to the recipient's name first typed in. Otherwise, the system operates the same for each document thereafter to be personalized. Once personalization has been completed and the OK Button 794 clicked (Select 191), the subroutine returns to Screen 770.

At this point the subroutine allows the method of payment to be selected or an entirely new transaction to be initiated. Assuming the Method of Payment has been enabled for the various alternate methods of paying as discussed above and illustrated by buttons 772, the operator can offer the customer various ways of paying for the documents purchased. Should a check or credit card be selected as Selection 192 by clicking the appropriate labeled buttons 772 with cash being the default selection, the system may be set up to verify the check or card (Input 195) as respective Decisions 194 and 196. Assuming Yes in either case or cash is used, the OK button 773 is clicked, causing the system to print the documents (Print 198) with the appropriate amounts, messages, names and other indicia on the documents. Once printing has been completed, the system returns to Start Screen 400 for further transactions.

Before printing, but at any time in the document customizing routine, the operator may click Purchaser information Button 770a as Select 197 and a Purchaser Information Screen 800 appears as shown in FIG. 2J. Inputting information into this screen stores such information for various uses, such as for demographics and other purposes. This data is not printed on the documents or connected to the transactions. Clicking the OK button 802 for this screen returns the subroutine to Screen 790.

Issuing Documents with Discounts

From time to time, it may be desirable to issue documents at a discount from the face amount to certain organizations or persons such as, for example, charitable groups and the like. In such case, the documents will display the full amount, and the system will automatically calculate a discounted total for payment purposes.

Referring back to the flow chart of FIG. 5A and Screen 400 of FIG. 1, it may be seen that when the Issue with Discount Button 404 is clicked (Select 159), the Pass Code Screen 740 appears as before. The subroutine operates identically to the issue subroutine except for the calculations. Once the pass word has been confirmed, Issue Screen 770 appears with the Discount Field 770b being activated. The percent discount is a default and was entered in document set up and cannot be changed unless the set up procedure is followed using the diskette key. The subroutine thereafter follows the same sequence as with a regular non-discounted document.

Issuing With Fee

At times, the user of the system may desire to charge a fee for each document that is issued. This sub-routine of the system is similar to the issue with discount sub-routine. Again the precise fee is selected by inserting the key diskette and selecting Setup from the menu on the Start Screen 400 followed by selecting Document Setup from the listed menu. At this point, the precise fee can be determined and entered which in turns enable the Issue Fee Button on the Start Screen 400. When the regular operator opens the program, the Issue Fee Button shown in dashed lines in FIG. 2A takes the place of the Issue Button and the ensuing procedure will be as with the Issue and Issue—with—Discount sub-routines.

Voiding Documents

Figure 6:
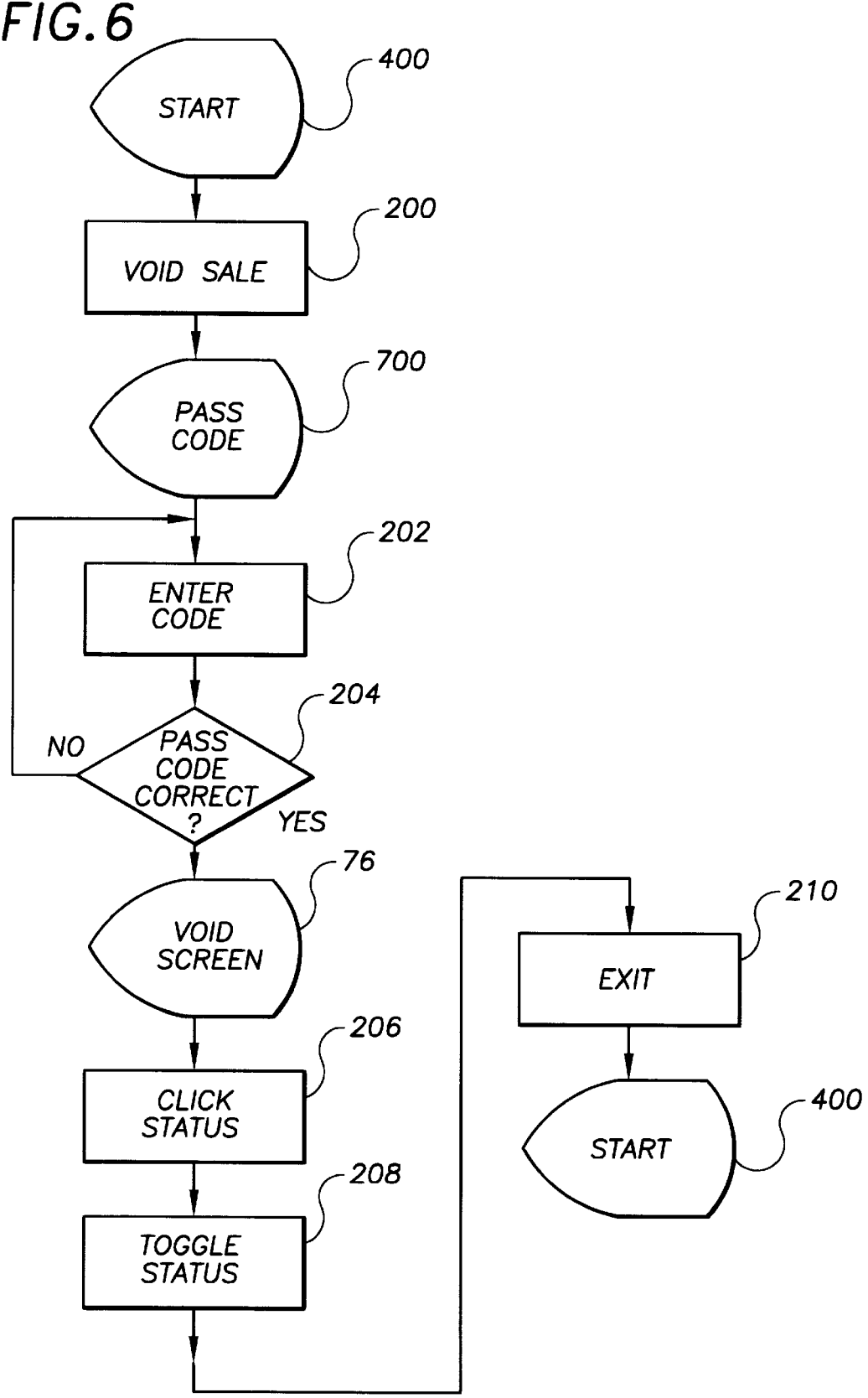
FIG. 6 represents a flow diagram for the voiding of certain documents tied to certain illustrations of appropriate major screens.

There are various situations in which the system may be used to void a transaction. For example, a document might be issued for an erroneous amount, a serial number found to be out of sequence, or a printer jam occurs causing one or more of the documents to be damaged. Additionally, a purchaser may change his or her mind and desire that a completed transaction be voided and a new document be issued in lieu thereof. As long as the documents were issued during the same day, an operator is able to accommodate the voiding of the document. The limitation of the voiding of documents in the particular day, precluding the voiding of documents following the close of the day's transactions, minimizes the possibility of the perpetration of fraud. The flow diagram depicting this sub-routine is illustrated in FIG. 6. As with the other transactions, clicking (operation 200) the void sale button 406 in Screen 400 causes the system to display the Pass Word Screen 740. Assuming the pass word is confirmed at Decision 204 following Enter 202, the Void Sale Screen 760 illustrated in FIG. 2F appears. The operator then finds the Serial Number of the document to be voided and moves to the status of the document in the Status Field 761 (Operation 206) and may toggle the status to void (Input 208). By clicking the OK Button 762 (Exit 210), the change of status to void is inputted into the system (Input 206) and Start Up Screen 400 reappears.

Should a printer jam occur causing some of the documents to be damaged and removed, the opening of the printer will require verification of the beginning and ending serial numbers of the remaining documents in the printer as described above. By correctly going through verification procedure, the system will conclude that removed documents removed, not being within the range of numbers in the printer as verified, are void.

REPORTS

The system provides for a variety of reports including (1) daily reports for all transactions that have been completed by the predetermined closing time for the selected day, (2) transactions completed by a specific operator either for the day that has not been closed out or any previous day that has been closed out, (3) reports for all closed transactions within a specified time period either for all operators or specified operators, and archived reports for a predetermined time period either for all operators or specified operators. 's closing, reports generated by the operator, reports automatically generated after each time period of a preselected duration, and reports that are archived. There is an additionally an automatic sending of the day's transactions to a central receiving device that is typically located at a remote facility and communicates with the system's modem via available communication channels. The system is initially configured to send all of the particular the information pertaining to the completed transactions a predetermined time period following whatever time is selected for the closing of the day's transactions. If, for some reason, the communications are interrupted prior to the transmission of this information, the system will continue at timed intervals to attempt to reach and report the transactions to the central receiving device until a successful handshake is made.

What is claimed is:

1. A system for the dispensing of customized documents having a monetary value comprising a control system including a data storage and retrieval unit;

a display device;

an input device for inputting information into said control system;

a printer for the printing of customized documents; and a plurality of document forms stored in said printer;

said control system responsive to (a) a start signal received from said input device for displaying a pass code entry menu and (b) a subsequent pass code signal received from said input device when a pass code associated with a system operator is inputted into said system through said input device and matches one of a plurality of unique pass code datum stored in said data storage and retrieval unit for sequentially displaying a plurality of menus for selecting and inputting document information through said input device, said document information including a value representing a number of purchased documents, an assigned value for each of said purchased documents, indicia representing a payee for each purchased documents, and first indicia representing a payee message, one of said plurality of menus setting forth an additional pull down menu permitting the selection through said input device of one of plurality of second indicia each representing a stored payee message, and said printer responsive to said control system for (a) printing said value, payee, and a payee message selected from a group consisting of said payee message and said stored payee messages on one or more respective document forms representing a number of documents purchased and (b) dispensing said printed and purchased documents.

2. The system of claim 1 in which a plurality of names of system operators is stored in said system, each operator being associated with one of a plurality of said passwords, said system being responsive to the entry of one of a plurality of passwords through said input device for preparing and dispensing customized documents.

3. The system of claim 2 including a control diskette, said system responsive to said control diskette being inserted into said controller for permitting the occurrence of one or more of the following:

a change to one of said pass words stored in said system;

a deletion of a name of an operator name stored in said system; and an addition of a name of another operator stored in said system.

4. The system of claim 3 in which said system provides for control parameters for the preparation and dispensing of documents, said system responsive to said control diskette being inserted into said controller for permitting alteration of said control parameters when alterations thereto are inputted in said system through said input device.

5. A system for the dispensing of customized documents having a monetary value comprising a control system including a data storage and retrieval unit;

a display device;

an input device for inputting information into said control system;

a printer for the printing of customized documents; and a predetermined number of unique document forms stored in said printer, said system in response to a first signal from said input device displaying on said monitor a display of a predetermined list of messages and responsive to a second signal from said input device for storing a selected one of said messages associated with a selected one of said forms for subsequent printing of the message on said selected one of said unique document forms, said input device accepting a unique message and said system storing said unique message for subsequent printing thereof on another of said unique document forms.

6. A system for the preparation and dispensing of customized documents having a monetary value comprising a control system including a data storage and retrieval unit;

a display device;

an input device for inputting information into said control system;

a printer for the printing of customized documents; and a predetermined number of unique document forms stored in said printer, each of said forms bearing a number in sequence, said system ceasing to prepare documents in response to the occurrence of one or more of the following:

a printer door being opened, the powering off and on of said printer, and said system being booted on and causing said display to display a message to verify the number of a first of said unique documents, said system continuing to prepare customized documents upon the entry of said number of said first of said unique documents response for causing said display device to display first indicia requesting entry of verification indicia representing the number of a first of said unique document forms, said system proceeding to prepare said unique documents in response to said first of said unique documents being inputted into said system though said input device.

* * * * *